US008960880B2

(12) United States Patent
Mills et al.

(10) Patent No.: US 8,960,880 B2
(45) Date of Patent: Feb. 24, 2015

(54) BINARY EPOXY INK AND ENHANCED PRINTER SYSTEMS, STRUCTURES, AND ASSOCIATED METHODS

(75) Inventors: Michael D. Mills, Moultonboro, NH (US); Joe Byrne, Sandwich, NH (US); Stephen Mills, Plymouth, NH (US)

(73) Assignee: Redwood Technologies, LLC, Moultonboro, NH (US)

(*) Notice: Subject to any disclaimer, the term of this patent is extended or adjusted under 35 U.S.C. 154(b) by 31 days.

(21) Appl. No.: 13/369,082

(22) Filed: Feb. 8, 2012

(65) Prior Publication Data

US 2012/0262527 A1 Oct. 18, 2012

Related U.S. Application Data

(63) Continuation-in-part of application No. 12/706,057, filed on Feb. 16, 2010, now Pat. No. 8,356,874.

(60) Provisional application No. 61/440,692, filed on Feb. 8, 2011, provisional application No. 61/167,750, filed on Apr. 8, 2009.

(30) Foreign Application Priority Data

Feb. 16, 2011 (WO) ................ PCT/US2011/025084

(51) Int. Cl.
*G01D 11/00* (2006.01)
*C09D 11/00* (2014.01)
(Continued)

(52) U.S. Cl.
CPC ................ *B41J 2/211* (2013.01); *B41J 2/2128* (2013.01); *B41J 11/0085* (2013.01)
USPC ....................................... 347/100; 106/31.13

(58) Field of Classification Search
CPC ........ B41J 2/211; B41J 2/2107; C09J 163/00; C09D 11/40; C09D 11/30; C09D 11/322
USPC .......... 347/7, 95, 100; 106/31.13, 31.27, 31.6
See application file for complete search history.

(56) References Cited

U.S. PATENT DOCUMENTS

| | | | |
|---|---|---|---|
| 4,384,288 | A | 5/1983 | Walton |
| 4,599,627 | A | 7/1986 | Vollert |

(Continued)

FOREIGN PATENT DOCUMENTS

| | | |
|---|---|---|
| EP | 1060895 | 12/2000 |
| WO | 2008074589 | 6/2008 |

OTHER PUBLICATIONS

"RFID Hardware Settings", Date/Location: Unavailable, RFID Inc. STX Reader, pp. 1-3.

(Continued)

*Primary Examiner* — An Do
(74) *Attorney, Agent, or Firm* — Michael A. Glenn; Perkins Coie LLP

(57) ABSTRACT

Enhanced media transport systems and structures are provided for printing environments. Enhanced vacuum table structures and associated methods may also be implemented for a variety of printer systems. Enhanced rail systems and associated carriage structures may preferably be used within a variety of printing environments, such as for but not limited to grand scale printers. Water-based binary epoxy ink compositions and associated processes provide adhesion and material compatibility that exceeds that of currently available UV curable products, while providing ultra-low volatile organic carbon (VOCs), and no hazardous air pollutants (HAPs). An integrated system and method for identification of consumables through a central database may also be implemented within different printing systems.

32 Claims, 27 Drawing Sheets

(51) Int. Cl.

*B41J 2/21* (2006.01)

*B41J 11/00* (2006.01)

(56) References Cited

U.S. PATENT DOCUMENTS

| | | | |
|---|---|---|---|
| 4,926,187 | A | 5/1990 | Sugawara et al. |
| 5,444,223 | A | 8/1995 | Blarna |
| 5,574,470 | A | 11/1996 | de Vall |
| 5,604,485 | A | 2/1997 | Lauro et al. |
| 5,635,969 | A | 6/1997 | Allen |
| 5,838,253 | A | 11/1998 | Wurz et al. |
| 5,874,902 | A | 2/1999 | Heinrich et al. |
| 5,914,862 | A | 6/1999 | Ferguson et al. |
| 5,964,656 | A | 10/1999 | Lawler et al. |
| 5,995,006 | A | 11/1999 | Walsh |
| 6,019,461 | A | 2/2000 | Yoshimura et al. |
| 6,043,746 | A | 3/2000 | Sorrells |
| 6,078,259 | A | 6/2000 | Brady et al. |
| 6,097,301 | A | 8/2000 | Tuttle |
| 6,100,804 | A | 8/2000 | Brady et al. |
| 6,100,840 | A | 8/2000 | Zidek et al. |
| 6,104,281 | A | 8/2000 | Heinrich et al. |
| 6,206,282 | B1 | 3/2001 | Hayes et al. |
| 6,218,942 | B1 | 4/2001 | Vega et al. |
| 6,232,870 | B1 | 5/2001 | Garber et al. |
| 6,265,977 | B1 | 7/2001 | Vega et al. |
| 6,305,548 | B1 | 10/2001 | Sato et al. |
| 6,346,881 | B1 | 2/2002 | Davidson |
| 6,361,138 | B1 | 3/2002 | Seino et al. |
| 6,385,407 | B1 | 5/2002 | Inose |
| 6,533,383 | B1 | 3/2003 | Saruta et al. |
| 6,644,771 | B1 | 11/2003 | Silverbrook |
| 6,808,255 | B1 | 10/2004 | Haines et al. |
| 6,938,976 | B2 | 9/2005 | Siwinski et al. |
| 7,431,436 | B1 | 10/2008 | Mills et al. |
| 2003/0043243 | A1 | 3/2003 | Trafton et al. |
| 2003/0081023 | A1 | 5/2003 | Miller et al. |
| 2004/0196347 | A1 | 10/2004 | Redding et al. |
| 2006/0279587 | A1 | 12/2006 | Furuichi |
| 2007/0076050 | A1 | 4/2007 | Sugahara et al. |
| 2008/0273066 | A1 | 11/2008 | Hiroki et al. |
| 2011/0014354 | A1 * | 1/2011 | Graham et al. .................. 427/8 |

OTHER PUBLICATIONS

"RFID Inc. Installation and Operating Manual, Model SIR and Model SR2", Simple Writer, Version 3/00, Date/Location: Unavailable, pp. 1-10.

* cited by examiner

BINARY EPOXY INK AND ENHANCED PRINTER SYSTEMS, STRUCTURES, AND ASSOCIATED METHODS

CROSS REFERENCE TO RELATED APPLICATIONS

This application is a Continuation in Part and claims priority for commonly disclosed subject matter to U.S. application Ser. No. 12/706,057, entitled Apparatus and Method for Precision Application and Metering of a Two-Part (Binary) Imaging Solution in an Ink Jet Printer, filed 16 Feb. 2010, which claims priority to U.S. Provisional Patent Application Ser. No. 61/167,750, filed 8 Apr. 2009, which are each incorporated herein in its entirety by this reference thereto.

This application also claims priority to U.S. Provisional Patent Application Ser. No. 61/440,692, entitled Tri-Lobal Unibody Media Transport Belt System, Vacuum Table, and Ink Composition, filed 8 Feb. 2011, which is incorporated herein in its entirety by this reference thereto.

This Application is also related to PCT Application No. PCT/US11/25084, entitled Apparatus and Method for Precision Application and Metering of a Two-Part (Binary) Imaging Solution in an Ink Jet Printer, filed 16 Feb. 2011, which claims priority to U.S. application Ser. No. 12/706,057, entitled Apparatus and Method for Precision Application and Metering of a Two-Part (Binary) Imaging Solution in an Ink Jet Printer, filed 16 Feb. 2010, which claims priority to U.S. Provisional Patent Application Ser. No. 61/167,750, filed 8 Apr. 2009.

BACKGROUND OF THE INVENTION

1. Technical Field

The invention generally pertains to ink jet printers, and particularly, to such printers using a binary imaging solution and multiple drop size ink jet print head technology.

2. Description of the Prior Art

A binary imaging solution uses colorants that each comprise a mixture of two ink components, where the two components are combined at the time the colorant is applied to a recording surface. Traditionally, to use a binary imaging solution in an ink jet printer, one channel of colorant per channel of reactant is used to ensure proper mixture of the two-part solution. This implementation, although feasible, has never really seen wide range adoption due to the cost associated with ink jet print head assemblies. In effect, this implementation would require double the number of print heads as compared to a uniary imaging solution.

As the demand for higher print quality and speeds has progressed in digital ink jet printing, print head technology has progressed in kind, starting from airbrush technology, having print resolutions of 4-9 dpi, to the newer drop-on-demand ink jets, having print resolutions up to 2400 dpi. At the older resolutions of sub-10 dpi it did not take many print heads to deliver acceptable printing speed considering that the size of the printed dot was 1⁄10 of an inch. Now consider that to generate images in the range of 1200 dpi the drop size would need to be 1⁄1200 of an inch. When working with drop sizes so small it takes many more drops to get an acceptable fill pattern when working with solid colors. This can only be accomplished in one of two ways: populate more ink jets into the product to increase coverage per pass of the print head array; or interlace many more print head passes of the print head array with the same number of print heads.

The first option would drive up printer cost to an unacceptable level, while the second option would drop productivity to unacceptable levels.

With the advancement in print head technology into grey scale functionality, the print head technology for grey scale functionality has provided an answer to this issue. These print heads generate multiple drop sizes from the same nozzle assembly. Therefore, one can generate a larger drop size when a good solid fill pattern is needed and a smaller drop size when higher detail is needed.

Prior to the introduction of grey scale print head technology the application of a binary imaging fluid was somewhat hampered also. For example, a traditional ink jet printer may have four color channels, including Cyan, Magenta, Yellow and blacK (CMYK). Other color channels employing colors such as White, Blue, Red, Orange and Green may also be used to increase functionality and color gamut. For these examples it is assumed that a printer uses seven color channels, one each for Cyan, Magenta, Yellow, blacK White, Blue, and Red, (CMYKWBR).

In traditional methods, for the application of binary solutions one of two options is selected. The first option is to use only one channel of reactant (CMYKWBRr), whereby one drop of reactant is applied to a location in an 'OR' methodology, where it would be applied to any drop location that is slated to receive, or already has received, a colorant drop. This method, although acceptable for a surface preparation type of implementation or an over coating application, is not effective for accurate metering of the binary mixture ratio. This is because each printed location could have anywhere from one to seven colorant drops placed in that location and only one drop of reactant. The ratio of reactant to colorant drops, assuming similar drop sizes, could be anywhere from 1:7 to 1:1. This is the method taught by Allen (U.S. Pat. No. 5,635,969), whereby the reactant channel is used as a pre coat for the colorant to control dot gain and other print artifacts.

A second option would be to have one channel of reactant per channel of colorant to provide for accurate mixing of the solution (CrMrYrKrWrBrRr). To provide the same speed and functionality as the previous example it would require 14 separate channels to provide accurate ratio metering at speed. This method is taught by Vollert (U.S. Pat. No. 4,599,627), whereby every drop of colorant is matched to a single drop of reactant to ensure a consistent ratio.

Although this solution is functional in providing an accurate mixture of the binary solutions in a controlled ratio, it is largely cost prohibitive due to the volume of additional print heads needed and ancillary equipment needed to support them as compared to uniary print systems.

Thus, a heretofore unaddressed need exists in the industry to address the aforementioned deficiencies and inadequacies in connection with binary imaging.

Traditionally, in the wide format ink jet market, in order for printers to utilize a wide variety of print medias desired by the customer base, it is necessary to print with a UV curable ink. However, there are often health and safety issues related to the use of the UV curable ink products.

It would therefore be advantageous to provide more environmentally friendly inks, with ultra-low VOCs and no HAPs. The development of such inks would be constitute a significant improvement over prior ink technologies.

Some conventional systems for media transport comprise two coaxial rollers, with a belt stretched between them. If and when such a system is perfectly square, this configuration may be adequate. However, belts are often not square, such as due to manufacturing processes involved with making them.

In such as design, a consistent tension is needed across the width of the belt, for the belt to track properly, and not try to run off the end of the assembly. To provide tension in a dual roller system with a belt that is not perfectly square, one of the rollers, referred to as a tension roller, is required to be skewed in relation to the second, stationary roller, to provide consistent tension across the belt.

While such a structure may prevent the belt from working its way off the end of the assembly, this approach inherently introduces another, more difficult problem. While the tension applied across the belt may be consistent, the stationary roller and the tension roller are longer parallel to either each other and to the media that is being transported, wherein such a system tends to skew and wrinkle the media, making it very difficult to print, and increases the danger of head strikes, i.e. direct contact between one or more print heads and the media.

It would therefore be advantageous to provide a media transport system that can compensate for less than perfect drive belts, while retaining a belt path that is parallel to a printing media. Such a system would constitute a significant technological advance.

To provide sufficient belt tension across a span of greater then 1.5 meters, conventional rollers have previously been large in diameter, with heavy walls and internal support structures. Such rollers are often prohibitively expensive and complex, to avoid deflection in the middle of the roller.

Alternate systems have been used to avoid such deflection, wherein a backer roller contacts the main roller, and supports the main roller from the rear, in a location that supports the main force of deflection. Such approaches often require a non-coated metal section of the roller where the backer rollers support the system. This adds to the cost of the roller, and often has wear issues that require frequent service and replacement.

It would therefore be advantageous to provide a more cost effective and robust roller system, which adequately minimizes deflection. Such a system would constitute an additional technological advance.

In prior media transport systems for inkjet printers, a vacuum table is typically placed under a transport belt, to hold the print media flat and true while the print heads traverse over the media. However, the amount of vacuum needed to hold media flat can sometimes provide so much drag on the system that the media transport motor can no longer accurately step the belt, due to limits in its ability to overcome the torque and force required. The media can also become warped, such as due to a number of reasons, including storage issues and heat applied during the print process.

It would therefore be advantageous to provide an enhanced structure and associated process that provides accurate retention of media without undue stress, as well as accurate movement of the media. Such an improvement would constitute a significant technological advance.

In typical grand format printing systems, the carriage is mounted to a rail system on a series of slide rails and bearings, in a cantilevered fashion. Because of this, the length of the inkjet array is typically limited by the manufacturing tolerances involved with the straightness and parallelism of the rails. For printing systems that comprise two independent rails, the associated support structures can cause a number of challenges, particularly in regard to the straightness and parallelism of the two rails.

It would therefore be advantageous to provide a rail system for a printer, e.g. a grand format printer, which reduces telebanking and manufacturing issues associated with straightness and parallelism of the rails. Such a system would constitute a major technological advance.

SUMMARY OF THE INVENTION

An enhanced printing method and apparatus applies a binary imaging solution, e.g. a two part water-based epoxy ink, to a print media in such a way as to provide for accurate ratio metering of two parts of the imaging solution. By exploiting grey scale print head technology in the application of binary imaging solutions to a medium, it is possible to meter a more precise mixture ratio of the two parts with the addition of only one or possibly two jetting channels of reactant for multiple color channels.

In the preferred embodiment of the invention, the ink jet printer may have, for example, seven color channels including Cyan, Magenta, Yellow, blacK, White, Blue, and Red, and one or two channels for reactant (rCMYKWBRr') or (rCMYKWBR). Metering of the proper ratio of colorant to reactant is accomplished by calculating a summed total volume of colorant drops applied to a particular location and adjusting the drop sizes generated by the reactant channel, or both channels in the case of multiple channels, to apply the proper mixture ratio of the solutions. The use of multiple channels, for example, two channels also aids in the mixing of the solutions by adjusting the order in which the colorants and reactant are applied to the drop location.

Several enhanced structures are also disclosed, such as tri-lobal unibody media transport systems and structures, enhanced vacuum table structures and associated methods, enhanced rail systems and associated carriage structures. Binary epoxy ink compositions are also disclosed, such as to provide adhesion and material compatibility that exceeds that of currently available UV curable products, while providing ultra-low levels of volatile organic carbon (VOCs), and no hazardous air pollutants (HAPs).

DETAILED DESCRIPTION OF THE INVENTION

An embodiment of the invention comprises a method and apparatus for the precise metering of a binary imaging solution to each pixel location of an ink jet image on a substrate. The two parts of the binary imaging solution, when combined in the proper ratio, initiate a chemical curing reaction the causes the fluid to transform into a solid or near solid state in a predetermined amount of time. Additionally the chemical reaction of the two fluids causes the material to bond with the substrate and allow for consistent adhesion and imaging characteristics.

Figure 1:
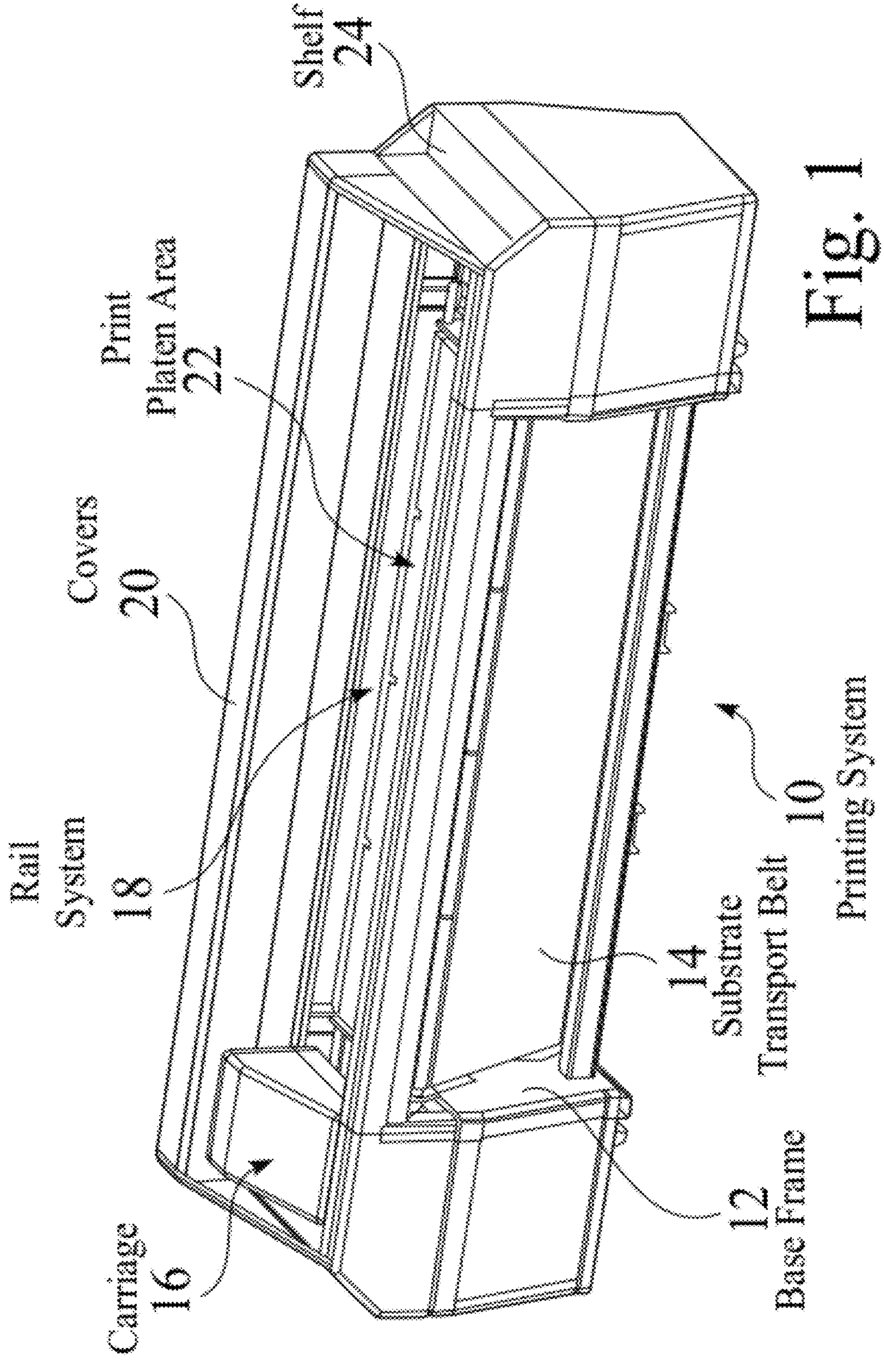
FIG. 1 is a perspective view of an exemplary enhanced printing system.

FIG. 1 shows a printing system, generally identified as 10, provided with a carriage 16. The bottom surface of the carriage 16 holds a series of grey scale ink jet print heads configured for printing images on a variety of substrates. Typical substrates include both flexible and non-flexible substrates, such as textiles, polyvinyl chloride (PVC), reinforced vinyl, polystyrene, glass, wood, foam board, and metals.

Figure 2:
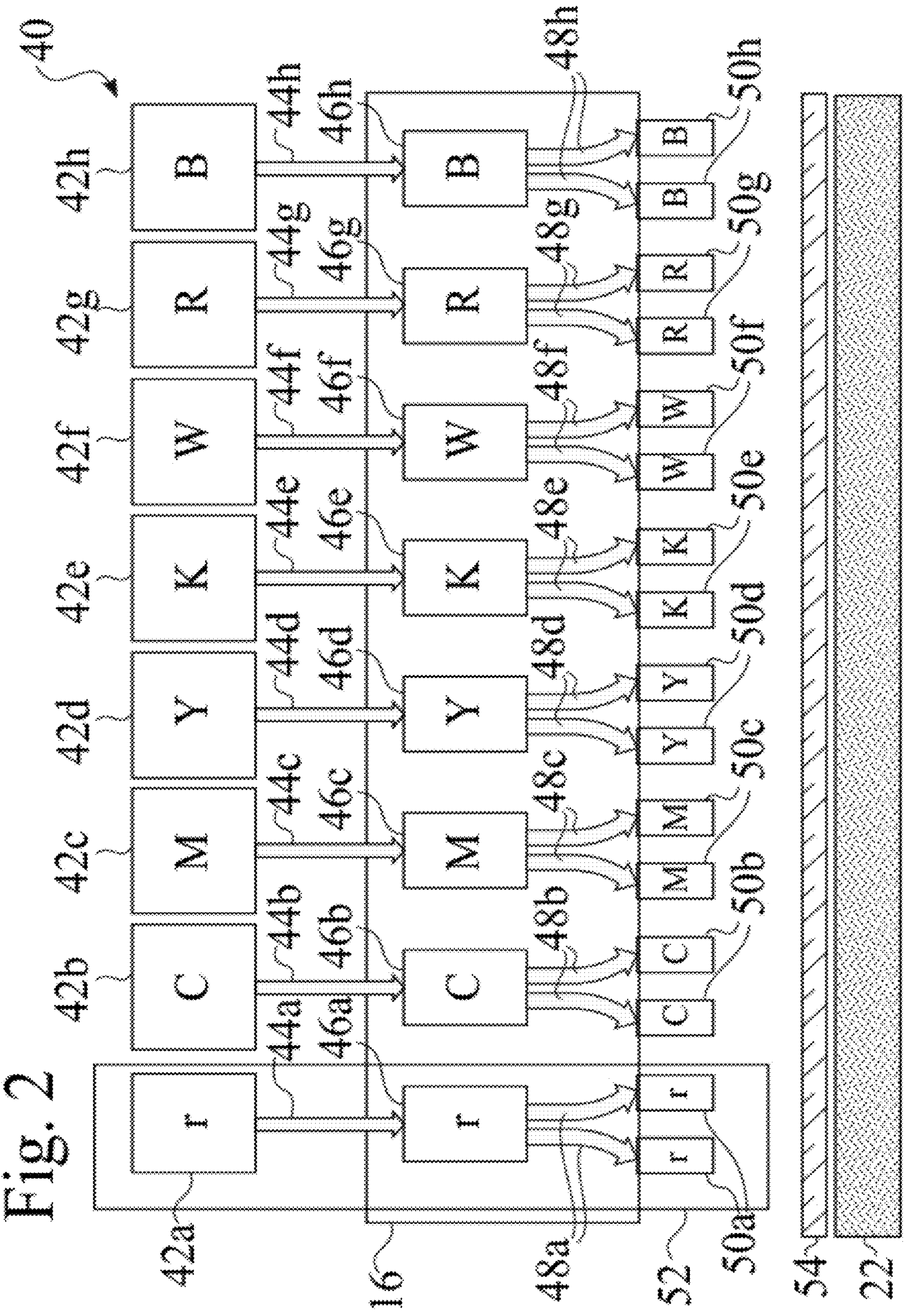
FIG. 2 is a schematic view of a carriage of the printing system of FIG. 1 having a plurality of print heads and one reactant channel.

In addition to the carriage 16, the printing system 10 includes a base frame 12, a substrate transport belt 14 that is used to transport a substrate 54 (FIG. 2), which is held to the top of the transport belt 14 through the depth of print platen area 22, and a rail system 18 that is attached to the base frame 12. The carriage 16 is transported along the rail system 18, thus providing a motion path oriented perpendicular to the substrate transport direction and parallel to the surface of the print platen area 22. The carriage motion along the rail system 18 is facilitated by an appropriate motor drive system, thus allowing it to traverse the width of the print platen area 22 at a reasonably controlled rate of speed. Accordingly, the transport belt 14 intermittently moves the substrate 54 (FIG. 2) through the depth of the print platen area 22 in such a way that the carriage 16 is allowed to traverse back and forth over the substrate 54 (FIG. 2) and deposit imaging solution droplets onto the substrate 54 (FIG. 2) via a series of multiple drop size, also referred to as grey scale, ink jet print heads 50, e.g. 50*a*-50*h* (FIG. 2).

Grey scale print heads 50 typically have a native drop volume, which is the smallest drop volume that can be deposited by the head. These print heads facilitate the application of variable drop sizes to the substrate 54 in a particular pixel location by applying multiples of the native drop volume to a pixel location. For example, if the native drop volume of a particular print head is 10 pico-liters (0.000000000010 liters) and has four grey levels, i.e. the native drop volume multiplied by 0, 1, 2, and 3, then the available drop sizes for that print head are 0 pl, 10 pl, 20 pl, and 30 pl, respectively.

After a carriage pass is completed and a portion of the image is applied to the substrate, the substrate is indexed, or stepped, again via the transport belt 14 and located accurately for the next pass of the carriage 16 and the next portion of the image to be printed. This process is repeated until the entire image is applied to the print substrate 54.

The series of print heads 50, e.g. 50*a*-50*h* (FIG. 2) receives one or more colored imaging solutions (colorants) as well as one or more channels of reactant from a set of secondary fluid containers 46, e.g. 46*a*-46*h* (FIG. 2) which are also mounted in the carriage 16. In addition, a set of primary fluid containers 42, e.g. 42*a*-42*h* (FIG. 2) supply the colorants and reactant to the secondary fluid containers. Unlike the secondary fluid containers 46 (FIG. 2), the primary fluid containers 42 (FIG. 2) are located remotely from the carriage 16, for example, on a shelf 24 located on the frame structure 12. The base frame 12 and rail system 18 is typically covered by a system of covers 20 for safety and aesthetic reasons.

FIG. 2 shows in more detail the fluid delivery path from primary fluid tanks 42, e.g. 42*a*-42*h*, to a series of grey scale print heads 50, e.g. 50*a*-50*h*, associated with each imaging fluid (both colorants and reactant) for a system with a single channel of reactant. The series of print heads 50, e.g. 50*a*-50*h*, may contain a single print head 50 or a plurality of print heads 50. Each series of print heads 50, e.g. 50*a*-50*h*, is in fluid communication with its associated secondary fluid tank 46, e.g. 46*a*-46*h* via a manifold delivery system 48, e.g. 48*a*-48*h*. Likewise, the imaging fluids are delivered from primary fluid containers 42, e.g. 42*a*-42*h* to secondary fluid tanks 46, e.g. 46*a*-46*h* via a series of delivery tubing, filters, and pump systems illustrated in FIG. 2 as 44, e.g. 44*a*-44*h*. Accordingly, by depositing various droplets of colorants and reactant onto the substrate 54, which is held in place within the print platen area 22 by the transport belt 14, in the appropriate pixel locations, the desired image is formed. The fluids are combined on the substrate 54 through impingement mixing and allowed to cure chemically.

A fluid channel 52 is considered a single fluid path from start to finish including the primary fluid tank 42, e.g. 42*a*, the delivery system 44, e.g. 44*a*, the secondary fluid tank 46, e.g. 46*a*, the manifold delivery system 48, e.g. 48*a*, and an associated series of print heads 50, e.g. 50*a*.

Figure 3:
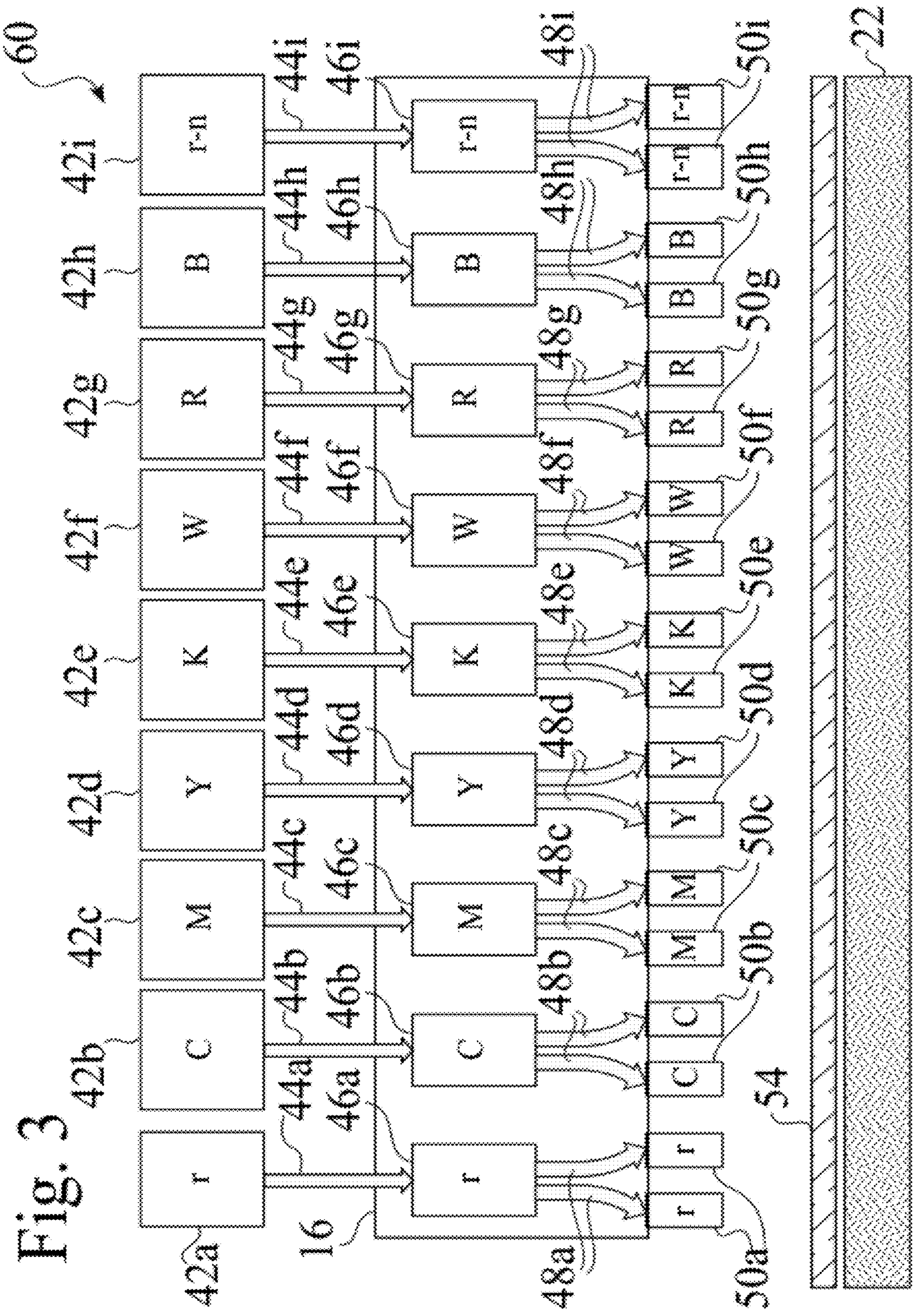
FIG. 3 is a schematic view of a carriage of the printing system of FIG. 1 having a plurality of print heads and multiple (n) reactant channels.

Note that the invention is not limited to the colors, number of color fluid channels, or color order and orientation illustrated in FIG. 2. The colorant fluid channels and the reactant fluid channel orientation vary by application. Therefore, the orientation and order shown is for illustration purposes only. As shown in FIG. 3, more than one reactant fluid channel can also be used, up to one less channel than the number of colorant fluid channels in use.

Figure 4:
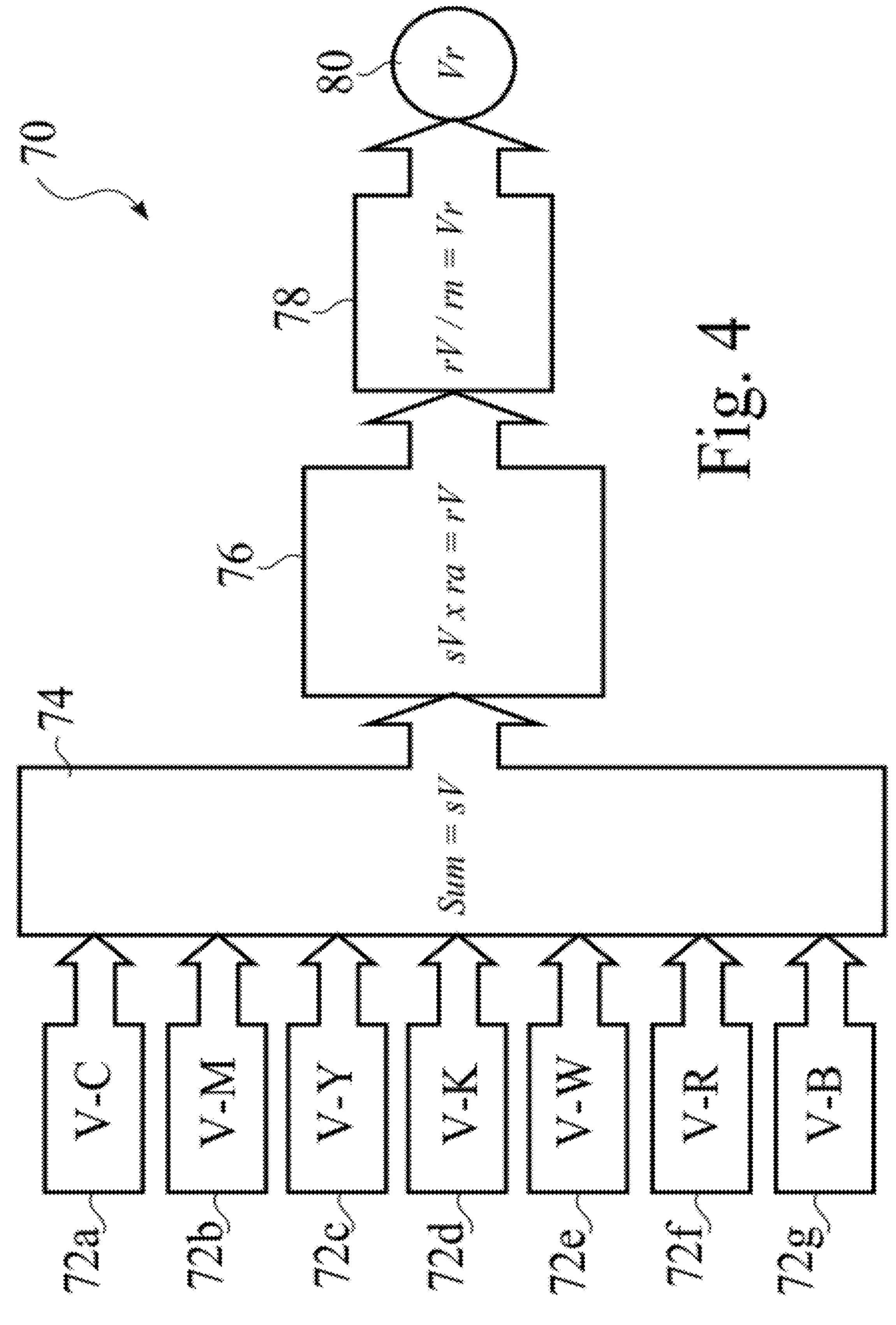
FIG. 4 is a simplified functional block diagram illustrating an algorithm that inputs the printing of a volume of multiple colorants, sums it, multiplies it with a mixture ratio to reactant, and determines the volume to be deposited via each reactant channel.

FIG. 4 shows a graphical representation 70 of an algorithm to be executed in a computing device containing a processor and memory, both sized appropriately to accommodate the image size in question. This algorithm allows the computing device to determine the sum total volume of colorant that is to be applied to a pixel location by all the colorant channels and multiplies it by the mixture ratio to determine the proper volume of reactant to be applied to the same pixel location. If the volume of reactant is larger than the volume that can be applied by a single channel of reactant, or if a better granularity of the mixture ratio can be achieved by distributing the volume of reactant to different drop sizes across multiple channels, the algorithm distributes the volume of reactant accordingly.

The volume of each colorant 72, e.g. 72*a*-72*g*, to be deposited to a particular pixel location is additively summed in function block 74 and represented by the variable sV for summed Volume. This summed volume (sV) is then multiplied in function block 76 by a proper mixture ratio (ra) to determine the total volume of reactant needed, represented by the variable rV. The proper mixture ratio (ra) is determined by the chemical properties of the binary printing solution and supplied by the manufacturer of said solution.

If the reactant channels in the printer are configured with print heads of the same drop volume, then the volume of reactant needed for the pixel location, represented by the variable rV, is then divided in function block 78 by the number of reactant fluid channels (rn) used in the printer system, resulting in the volume of reactant (Vr) to be deposited by each reactant channel 80 used in the printer.

The reactant channels in the printer may also be configured with print heads of different native drop volumes. If the printer is configured in this way then the volume of reactant to be deposited by each channel to a particular pixel location is adjusted according to the drop volumes of the print heads used in each channel. This configuration can be used to obtain the optimal granularity of mixture ratios possible with the given drop volumes delivered by various print heads.

Note that the invention is not limited to the colors, or number of colors in FIG. 4, and more than one reactant fluid channel can also be used, up to one less channel than the number of colorant fluid channels used.

An important consideration in practicing the invention is the fact that the reactant is not a surface preparation material and may be deposited before, after, or in between colorant drops. As long as the droplets are given ample opportunity for impingement mixing, and the proper mixture ratio is achieved, the two components of the binary imaging solution may be applied in any order or, in some cases, depending on the characteristics of the imaging solution, portions of the colorant and reactant may be applied in a specific order to accelerate the impingement mixing.

Exemplary Binary Epoxy Ink Formulations.

Figure 5:
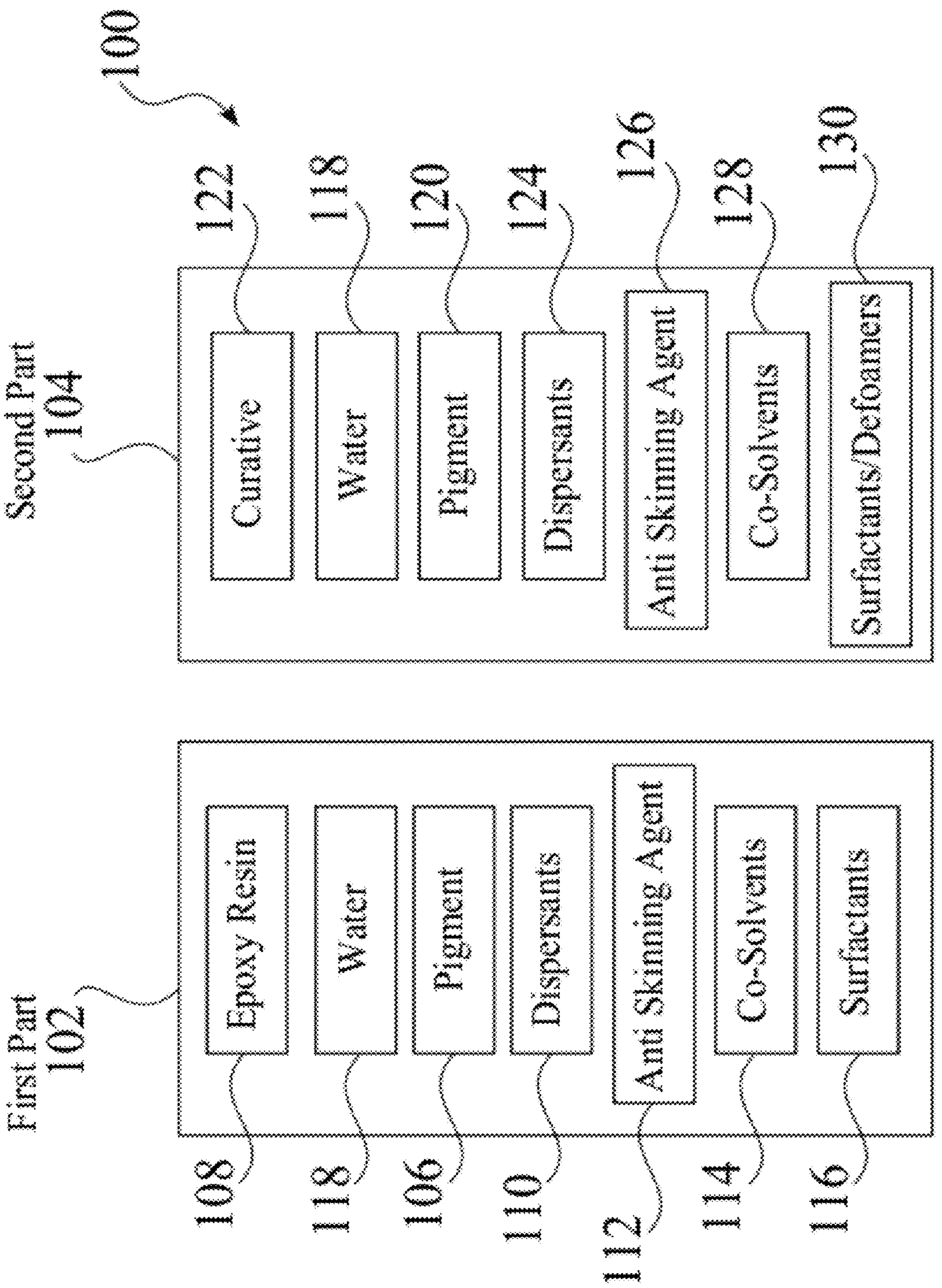
FIG. 5 is a block diagram of an exemplary water-based binary epoxy ink for an enhanced printing system.

FIG. 5 is a block diagram of an exemplary water based binary epoxy ink 100, which comprises a first part 102 and a second part 104, such as for printing with an enhanced printer 10 and associated methods, wherein the first part 102 and the second part 104 are configured to be jetted separately, and impingedly mixed on a media 54.

The first part 102 of the exemplary water based binary epoxy ink 100 comprises epoxy resin 108 and water 118, and may optionally further comprise any of pigment 106, one or more dispersants 110, an anti-skinning agent 112, one or more co-solvents 114, one or more surfactants 116, or any combination thereof.

The pigment 106, e.g. such as but not limited to an organic colorant, may comprise about 0 to 10 percent by weight. The epoxy resin 108, e.g. such as but not limited to Bisphenol-A (BPA) epoxy resin 108, may comprise about 0.1 to 20 percent by weight. The dispersants 110, e.g. high molecular weight block copolymers with pigment affinic groups, may comprise from 0 to about 20 percent by weight. The anti-skinning agent 112, e.g. such as but not limited a high flash point alcoholic solvent, may comprise about 0 to 10 percent by weight. The co-solvents 114, such as comprising any of a freezing point reducer, a dry speed modifier, a film former, or any combination thereof, may comprise anywhere from about 0 to 50 percent by weight. The surfactants 116, such as comprising any of a wetting agent, a film former, a defoamer, a polysiloxanes, butanedioic acid, or any combination thereof, may comprise anywhere from about 0 to 10 percent by weight. The water 118 in the first part 102 may comprise anywhere from about 1 to 99 percent by weight, such as depending on the chosen percentages of the other constituents.

The second part 104 of the exemplary water based binary epoxy ink 100 comprises curative 122 and water 118, and may optionally further comprise any of pigment 120, one or more dispersants 124, an anti-skinning agent 126, one or more co-solvents 128, one or more surfactants or defoamers 130, or any combination thereof.

In the second part 104, the pigment 120 e.g. such as but not limited to an organic colorant, may comprise about 0 to 10 percent by weight. The curative 122, e.g. such as but not limited to a modified polyamine resin, may preferably comprise anywhere from about 0.1 to 50 percent by weight. The dispersants 124, e.g. high molecular weight block copolymers with pigment affinic groups, may comprise about 0 to 10 percent by weight. The anti-skinning agent 126, e.g. such as but not limited a high flash point alcoholic solvent, may comprise about 0 to 10 percent by weight. The co-solvents 128, such as comprising any of freezing point reducers, dry speed modifiers, film formers, or any combination thereof, may comprise anywhere from about 0 to 50 percent by weight. The surfactants and/or defoamers 130, such as comprising any of polysiloxanes, butanedioic acid, or any combination thereof, may comprise anywhere from about 0 to 10 percent by weight. The water 118 in the second part 104 may comprise anywhere from about 1 to 99 percent by weight, such as depending on the chosen percentages of the other constituents.

The water based binary epoxy ink 100 has adhesion and material compatibility that exceeds that of currently available UV curable products, while providing ultra-low levels of volatile organic carbon (VOCs), and no hazardous air pollutants (HAPs), thus providing a more environmentally friendly solution to conventional UV curable inks.

Enhanced Media Transport Belt System.

Figure 6:
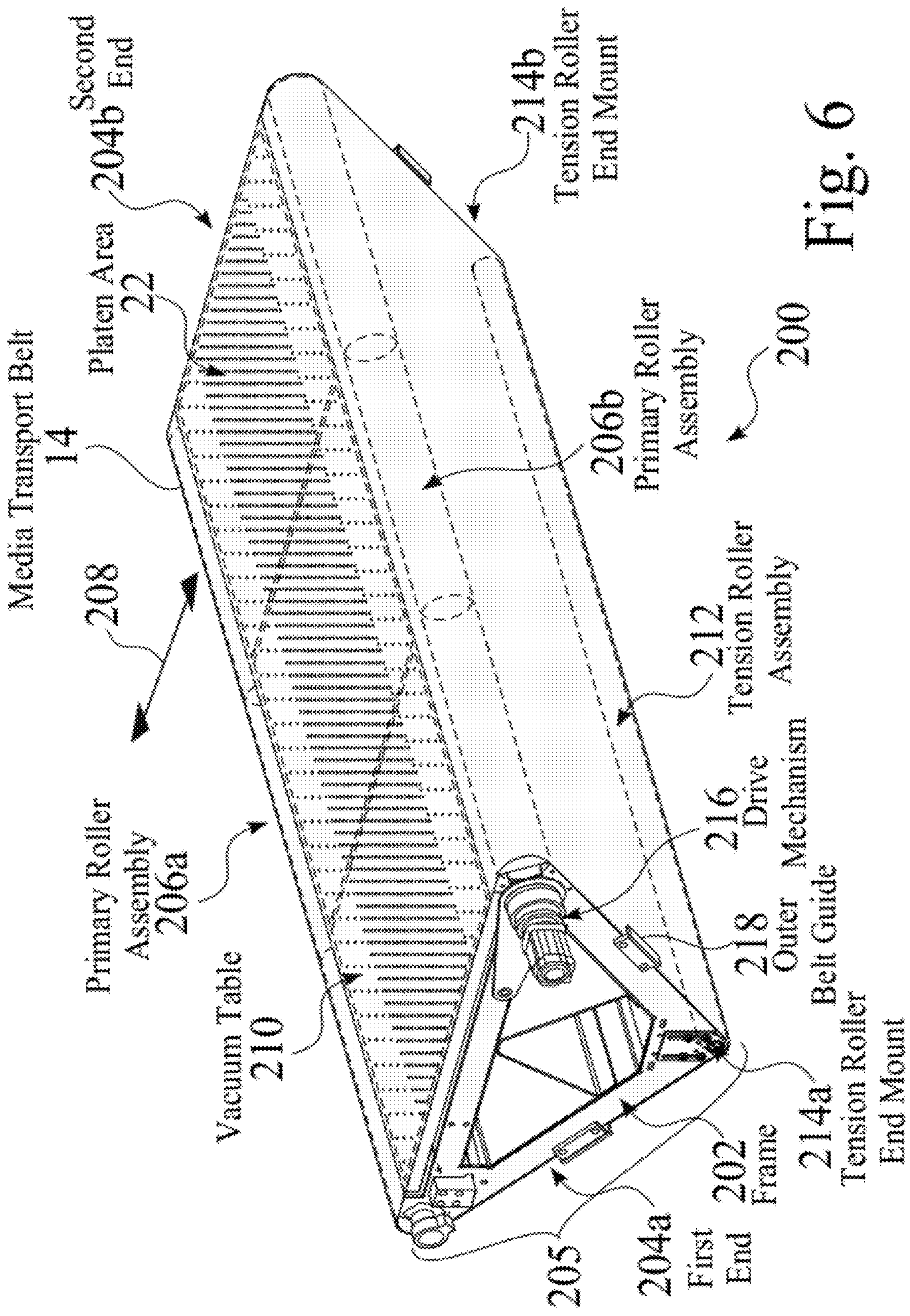
FIG. 6 is a perspective view of an exemplary tri-lobal media transport assembly for a printer.
Figure 7:
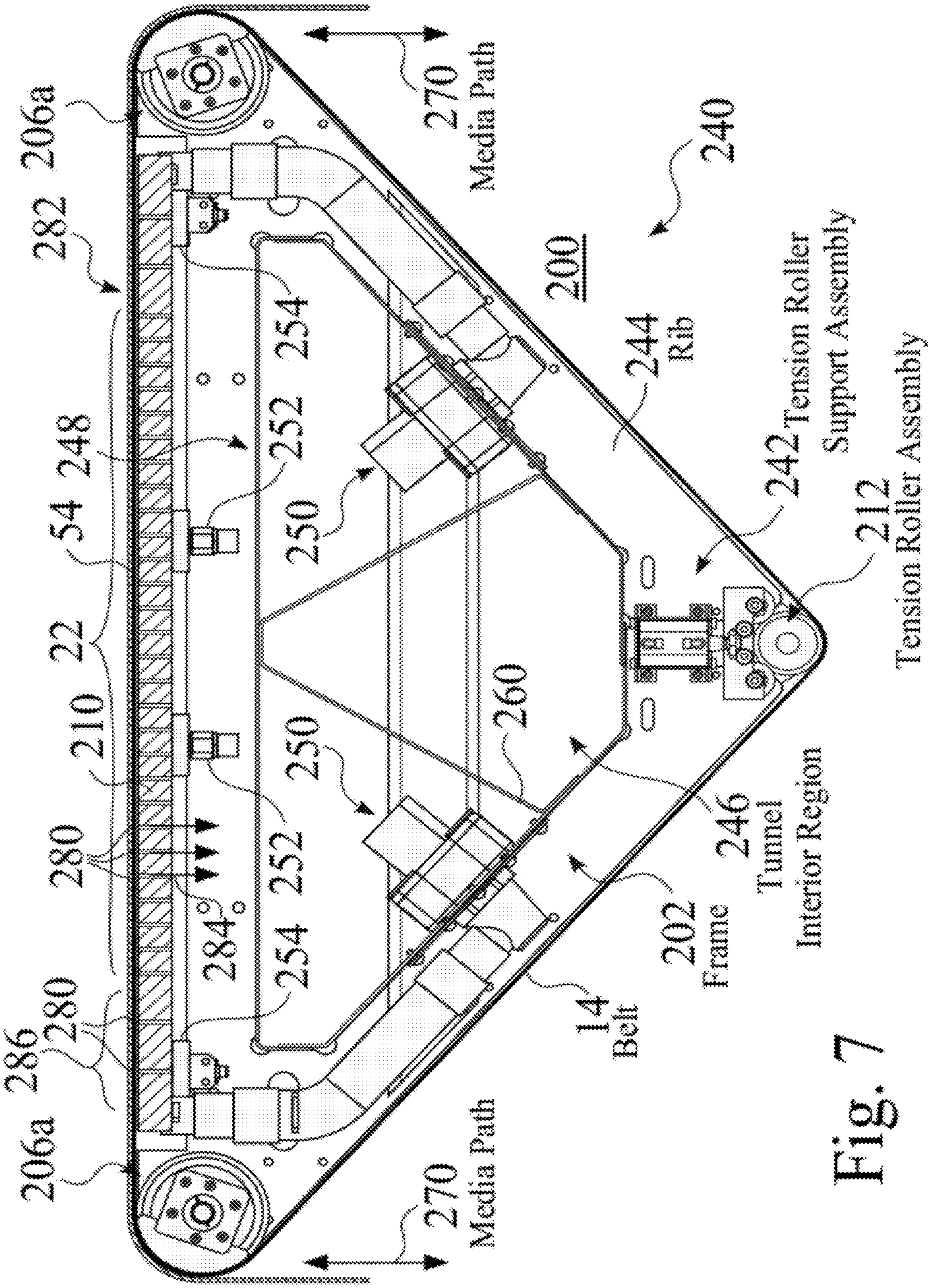
FIG. 7 shows an exemplary end view of a tensioning structure for a tri-lobal belt system.

FIG. 6 is a perspective view of an exemplary tri-lobal media transport assembly 200 for a printer, e.g. printer 10 (FIG. 1), which can compensate for less than perfect drive belts 14, while retaining a belt path that is parallel to a printing media 54 (FIG. 2, FIG. 7). FIG. 7 shows an exemplary end view 240 of a tensioning structure for a tri-lobal media transport system 200.

Figure 11:
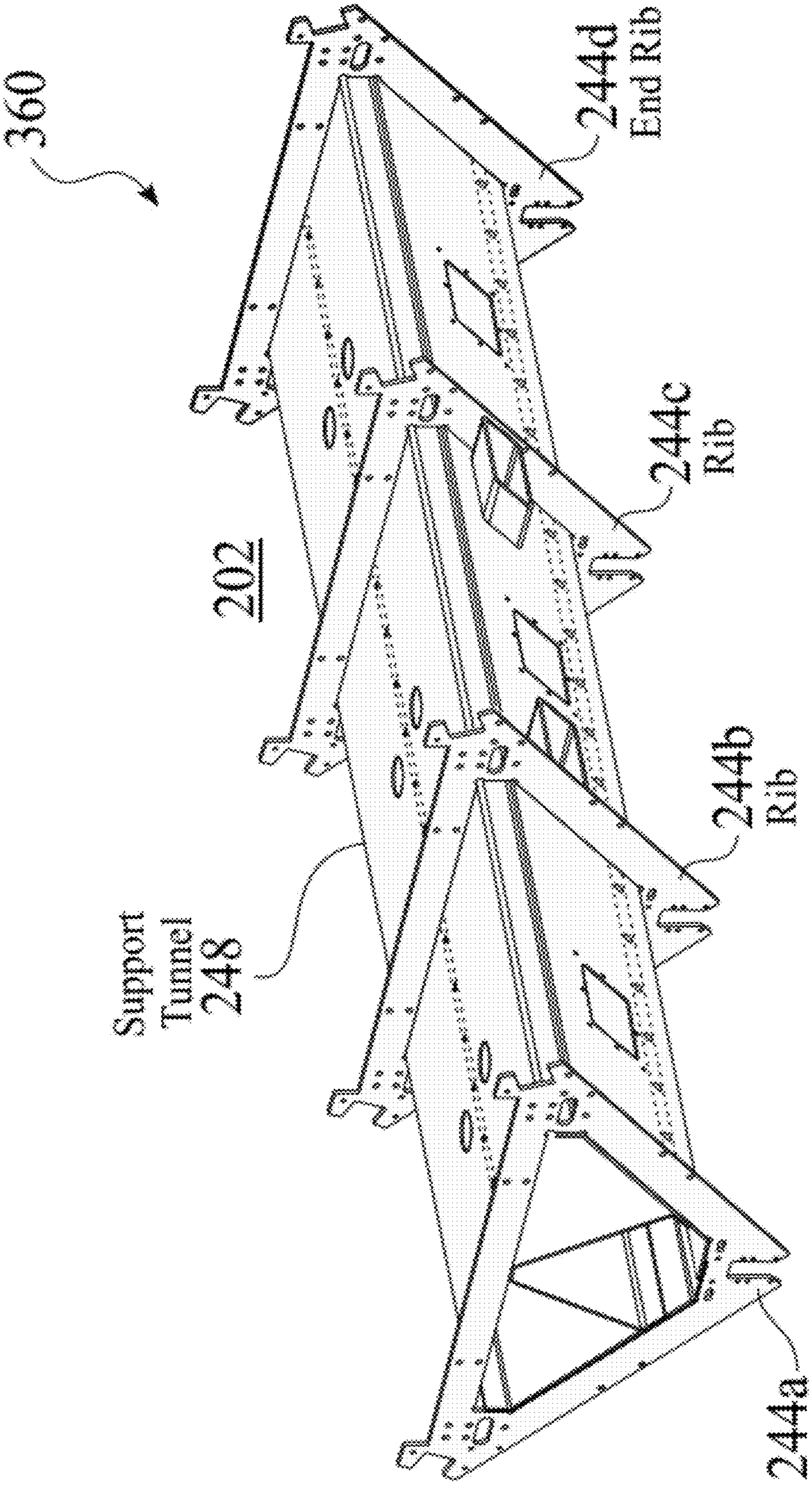
FIG. 11 is a perspective view of an exemplary support frame for a tri-lobal media transport system.

As seen in FIG. 6, a frame 202 extends from a first end 204*a* to a second end 204*b*, opposite the first end 204*a*. A first primary roller assembly 206*a* and a second primary roller assembly 206*b* are mounted to a frame 202, parallel to each other, on opposing sides of a vacuum table 210. A tension roller assembly 212 is mounted to the frame 202, e.g. below the primary roller assemblies 206*a*,206*b*, thus forming a tri-lobal belt support structure 205, wherein a belt 14 may accurately be moved 208 in relation to the vacuum table 210. As seen in FIG. 7 and FIG. 11, the frame 202 may preferably comprise a plurality of ribs 244 interconnected by a support tunnel 248, which has an interior region 246 defined therethrough. One or more internal braces 260 may preferably provide additional support within the interior region 246 of the support tunnel 248.

The tension roller assembly 212 is compliantly mounted, through a plurality of tension roller support assemblies 242, and tension roller end mounts 214*a*,214*b*. The tension roller assembly 212 can compensate for any irregularities in the squareness of the media transport belt 14, while leaving the two primary rolls 206*a*,206*b* perfectly parallel, to provide accurate media tracking.

As also seen in FIG. 6, a roller drive mechanism 216 is mounted to the frame 202, to controllably rotate primary roller assembly 206*b* and/or 206*a*, wherein the belt 14 is controllably moved or positioned 208 in relation to a print platen area 22.

The vacuum table 210 is fixably mounted to the frame 202, such as through mounting blocks 254 (FIG. 7). The vacuum table 210 has a plurality of passages 280 extending downward from the upper surface 282, wherein the density of the holes 280 in the central print platen area 22 may preferably be greater than the outer region 286. The media transport belt 14, such as comprising a flexible porous mesh or screen, also allows the passage of air, such as from an applied vacuum 284. For example, in some system embodiments, the media transport belt comprises woven polyester.

The passages 280 extend into the vacuum table 210, and are connected to one or more vacuum blower assemblies 250, wherein a vacuum 284 may controllably be applied through the vacuum table and the belt 14, to affix or release a substrate 54, such as in relation to a media path 270. The exemplary media transport assembly 200 seen in FIG. 7 further comprises one or more inboard dump valves 252, which may preferably be set to a desired level of applied vacuum 284, e.g. for controlled adhesion of a substrate 54 to the belt 14.

The first primary roller assembly 206*a* and the second primary roller assembly 206*b* may preferably be mounted to be perfectly parallel to each other, to provide a media path 270 that is true to the direction of travel 208 of the media transport belt 14. The tension roller assembly 212 may preferably tension the media transport belt 14, and can be angled slightly in an area outside the media path 270, to provide uniform tension across the media transport belt 14, without corrupting the straightness of the media transport belt 14 in the media path area 270.

Figure 8:
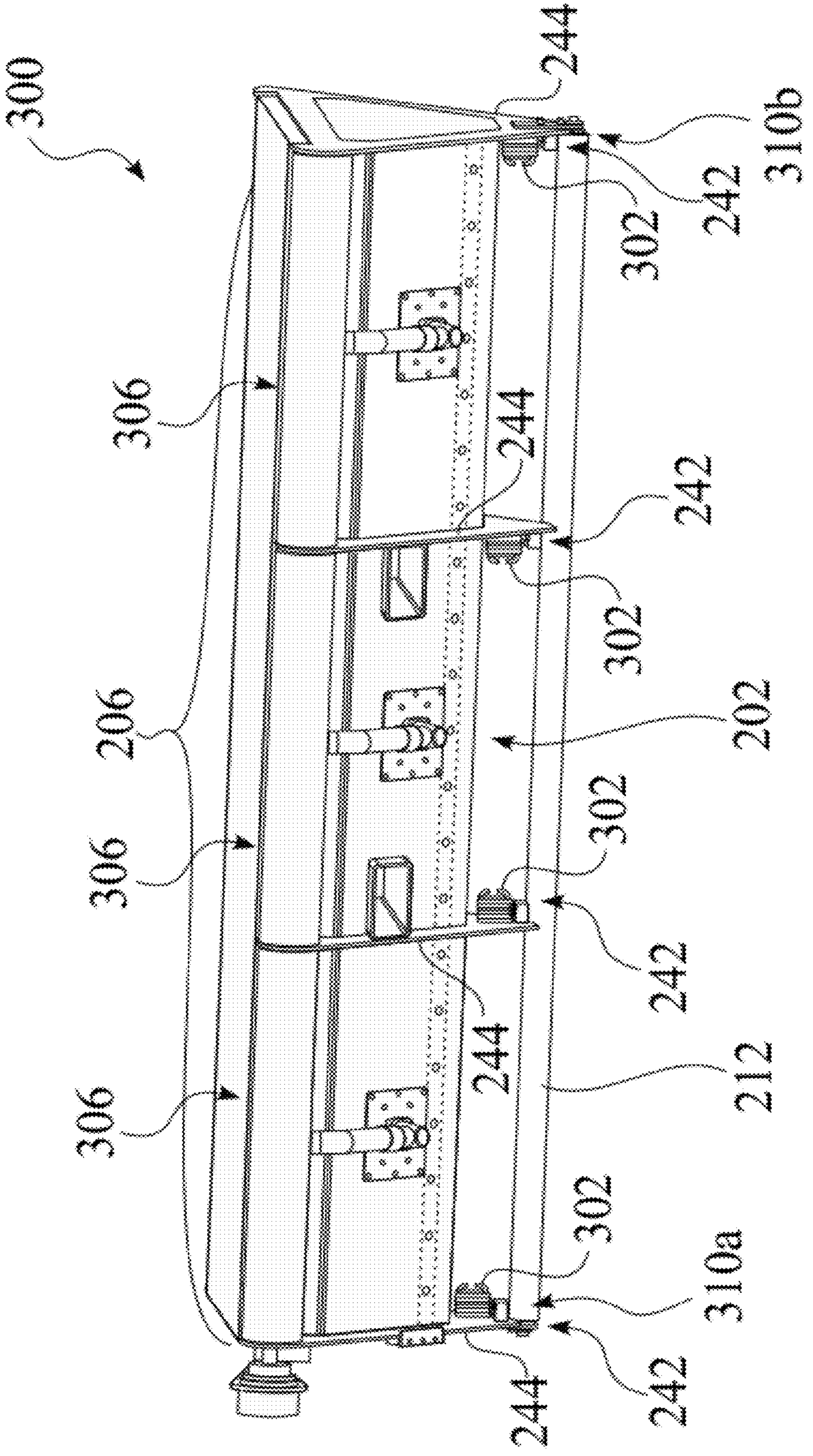
FIG. 8 is a perspective view showing a plurality of tension roller support assemblies in contact with a tension roller assembly.

FIG. 8 is a perspective view 300 that shows a plurality of tension roller support assemblies 242 mounted to a media transport frame 202, wherein a tension roller assembly 212 is compliantly mounted to the media transport frame 202 by the tension roller support assemblies 242 Each of the tension roller support assemblies 242 has a corresponding tension cylinder 302, to provide compliant mounting of the tension roller assembly 212. As seen in FIG. 8, the tension roller assembly 212 extends across the length of the frame 202, between a first tension roller end 310*a* to an opposing second tension roller end 310*b*.

Figure 9:
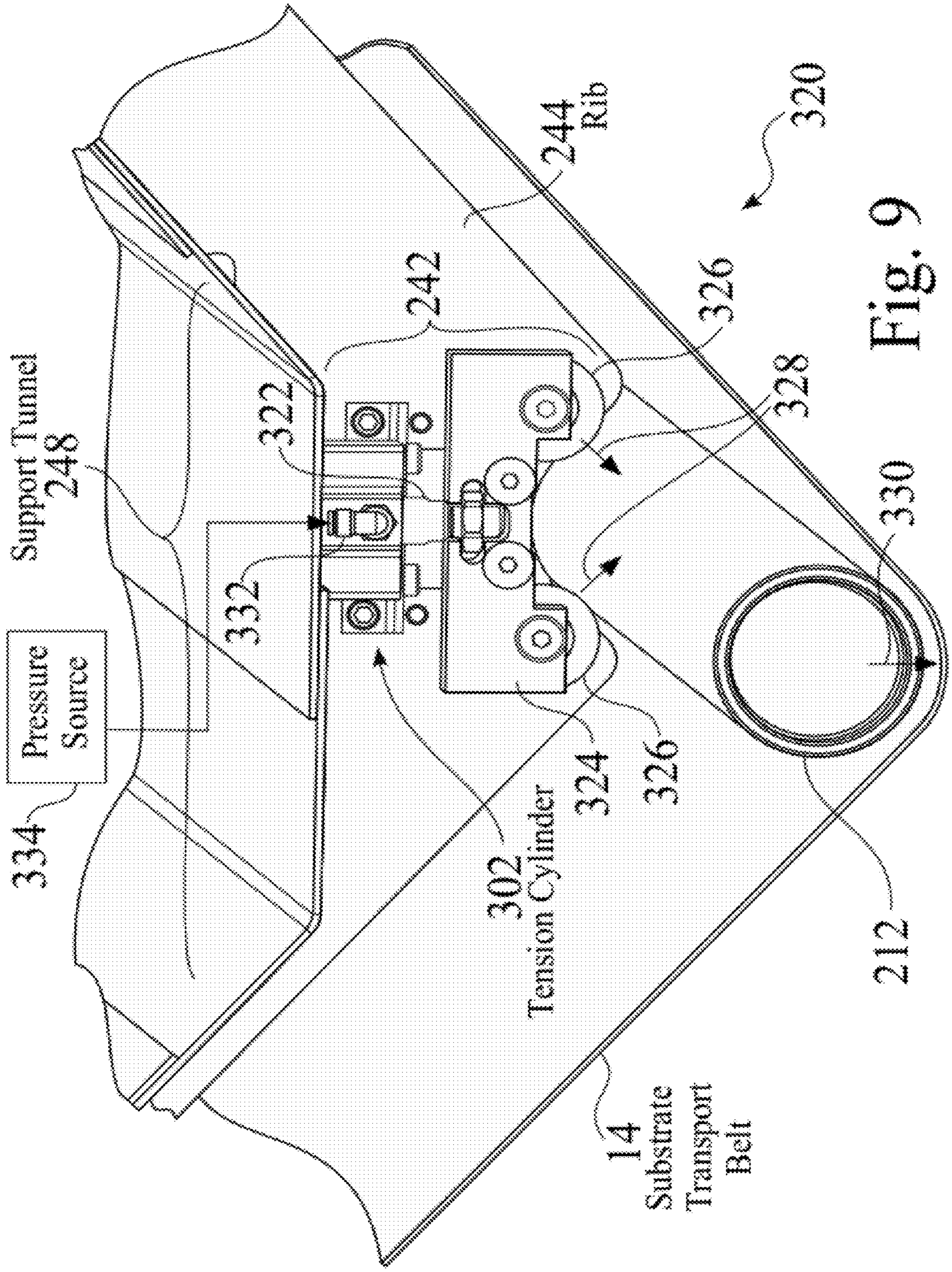
FIG. 9 is a detailed view of an exemplary tension cylinder assembly in contact with a tension roller.
Figure 10:
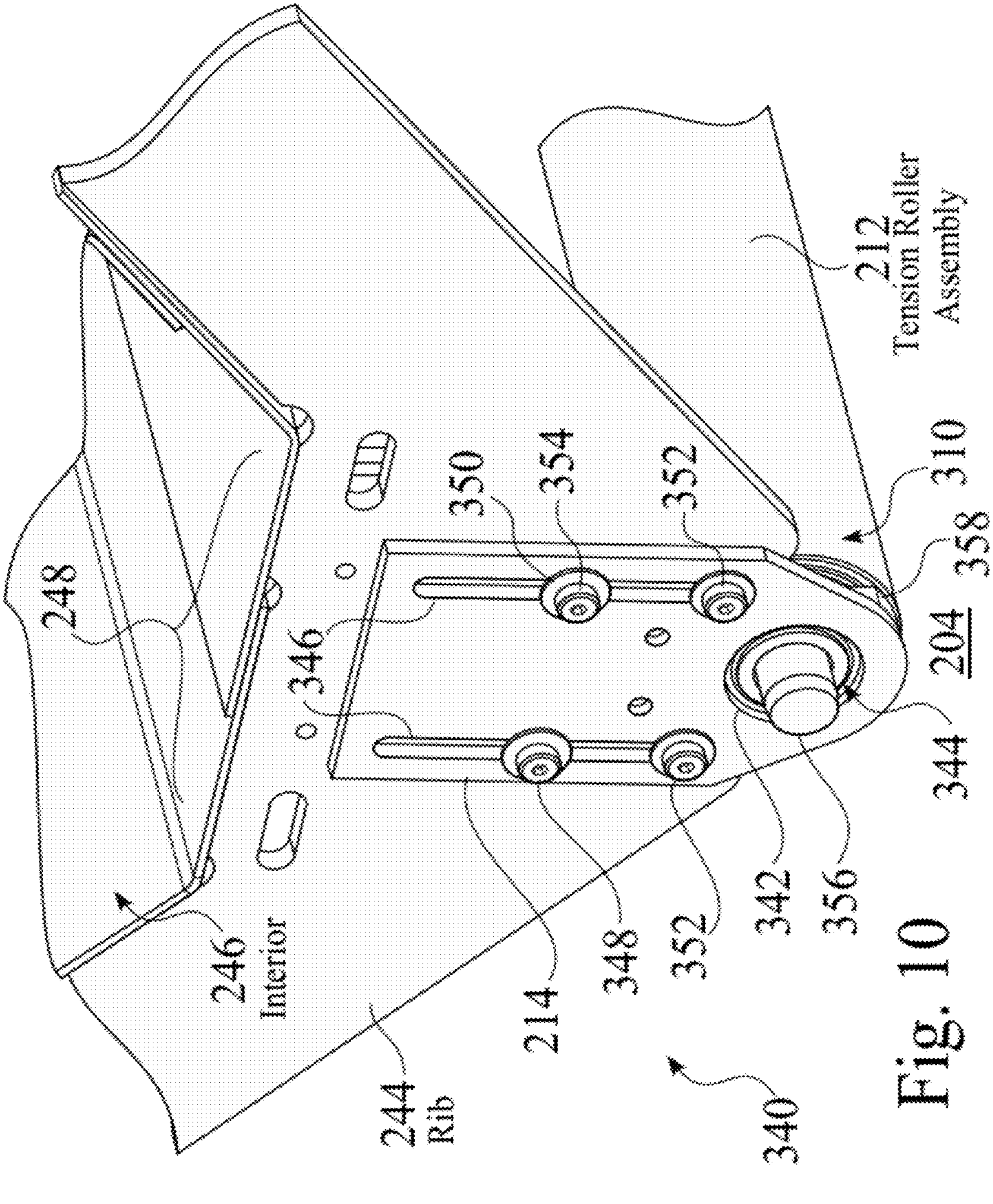
FIG. 10 is a detailed end view of an exemplary support structure for a tension roller.

FIG. 9 is a detailed view 320 of an exemplary tension roller support assembly 242 in contact with a tension roller assembly 212. FIG. 10 is a detailed perspective end view of an exemplary end support structure 340 for a tension roller assembly 212, such as at opposing ends 204 of the media transport structure frame 202.

The exemplary tension roller support assembly 242 seen in FIG. 9 comprises a tension cylinder 302 that is affixed to a corresponding rib 244 of a media transport frame 202. A plunger 322 extends from the tension cylinder 302, and is connected to a roller bias member 324. Bias rollers 326 are rotationally mounted to the bias frame 324.

Bias force may therefore be applied from the air cylinder 322 to the tension roller assembly 212, through the plunger 322, the bias member 324, and the bias rollers 326. For example, as seen in FIG. 9, radial force 328 applied from opposing bias rollers 326 results in force 330 applied to the belt 14 through the tension roller assembly 212, thus applying tension to the media transport belt 14.

The exemplary tension cylinder 302 seen in FIG. 9 comprises a port 332 for connection to a pressure source 334. In some embodiments, each of the plurality of pneumatic air cylinders 322 are connected to a single air source 334, and may preferably be regulated to provide adequate pressure 328 to apply a desired tension 330 to the media transport belt 14.

As seen in FIG. 10, the end 310 of the tension roller assembly 212 is also supported by an end mount 214. The exemplary end mount 214 seen in FIG. 10 includes mounting slots 346 defined therethrough, for connection to a rib 244 that corresponds with an end 204 of the frame 202. Fastener hardware, such as but not limited to hex screws 352, 354 and washers 354, may preferably be used to affix the end mount to the rib 244. The end mount 214 also comprises a through hole 342 defined therethrough, wherein a central axle 356 associated with the tension roller assembly 212 may provide a compliant pivot 344, in conjunction with a corresponding tension roller support assembly 242.

The end support structure 340 seen in FIG. 10 allows the tension roller assembly 212 to pivot slightly on both ends 204*a*,204*b*, to allow for a non-uniform stroke of the air cylinders 322, to compensate for any inaccuracy in the squareness of the media transport belt 14.

Support Frame Design.

FIG. 11 is a perspective view 360 of an exemplary support frame for a tri-lobal media transport system 200. The exemplary support frame 202 seen in FIG. 11 preferably comprises a unibody construction design, which requires no external frame structure. A support tunnel 248, such as comprised of sheet metal and/or structural plates, extends through a plurality of ribs 244, e.g. 244*a*-244*d*, to provide a robust frame 202 to support the media transport system 200, which restricts flexing and/or twisting, and provides precise alignment and straightness.

Primary Roller Assembly Alignment Plates.

Figure 12:
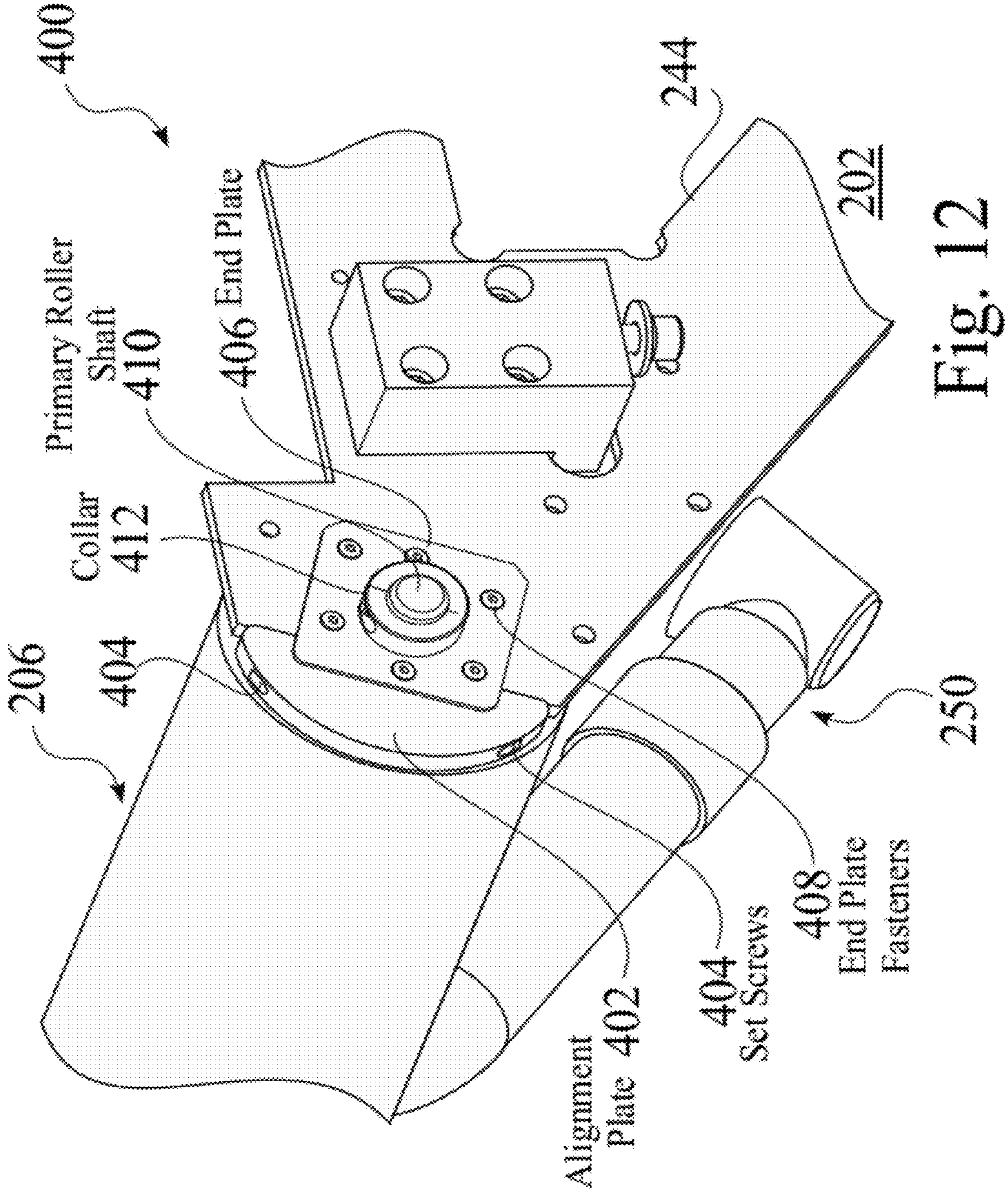
FIG. 12 is a detailed partial assembly view of a support assembly that comprises alignment plates that provide adjustable alignment of primary rolls.

FIG. 12 is a detailed partial assembly view of a support assembly 400 comprising alignment plates 402 that provide adjustable alignment of primary roller assemblies 206, e.g. 206*a*,206*b*.

As seen in FIG. 12, a primary roller shaft 410 extends through the primary roller assembly 206 and through an end plate 406, and is retained, such as by a collar 412. The end plate 406 is affixed to the frame 202 by fasteners 408. One or more set screws 404 associated with the alignment plates 402 provide precise adjustment of the alignment of the primary roller assemblies 206, wherein the set screws 404 precise alignment in a rigid and consistent manor.

Split Primary Roller Design.

Figure 13:
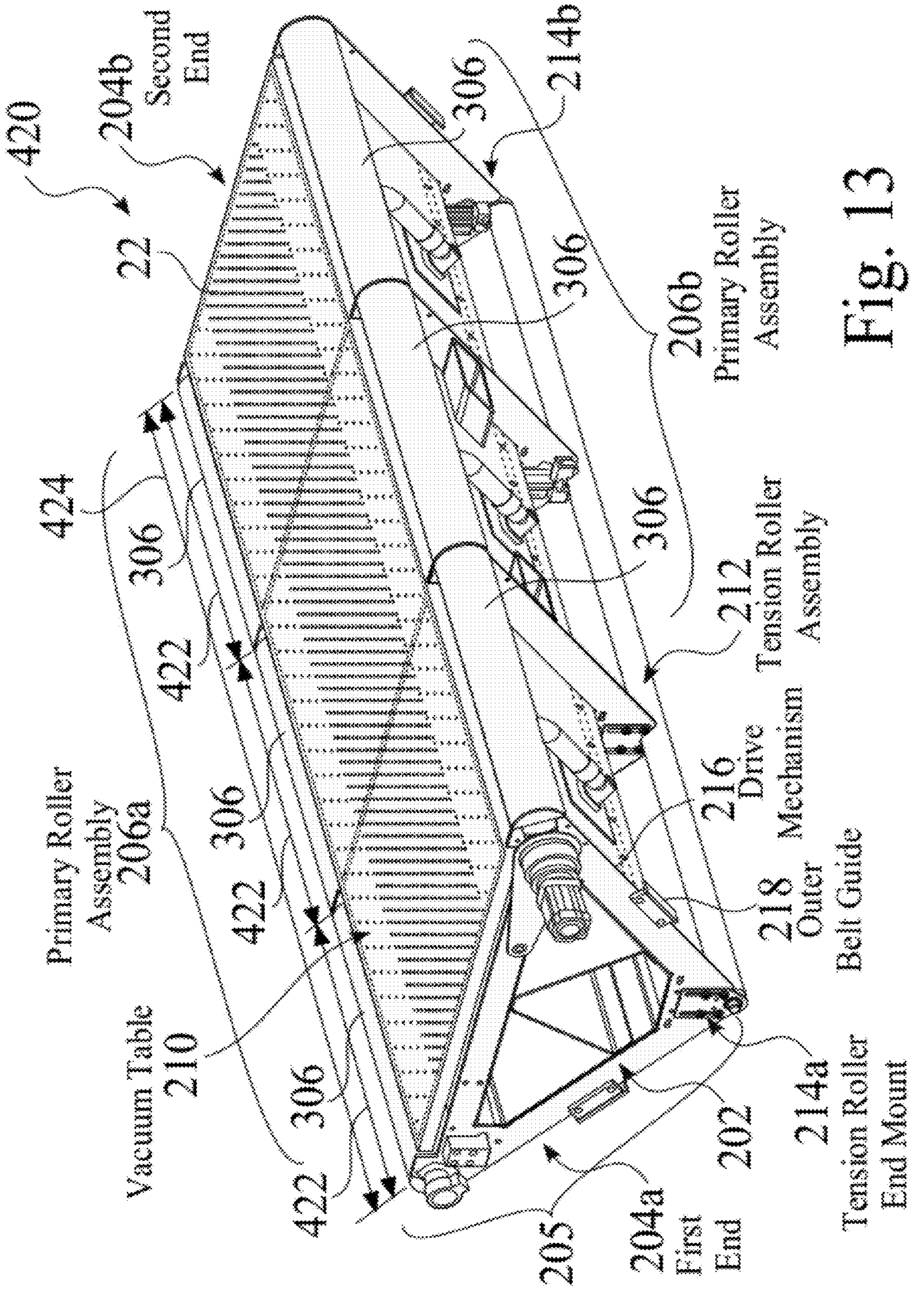
FIG. 13 is a perspective view of a frame structure having split primary rollers.

FIG. 13 is a perspective view 420 of a frame structure 202 having split primary roller assemblies 206. Each of the primary roller assemblies 206, e.g. 206*a*,206*b*, seen in FIG. 13 comprise a plurality of roller members 306. For example, the primary roller assembly 206*b* comprises three roller members 306 that extend longitudinally from the first end 204*a* to the second end 204*b* of the frame 202. Each of the roller members 306 are rotationally affixed to an axle 410 (FIG. 12), which is rotatably confined through each rib 244.

As each of the roller members 306 are mounted at each end to neighboring ribs 244, wherein each of the members 306 traverses a portion 422, e.g. a third, of the total length 424 of the primary roller assembly 206. Therefore, the roller members 306 may be economically constructed with a relatively small diameter, while providing sufficient tension for the media transport belt 14, and simultaneously minimizing roller deflection.

For a given overall length of the media transport system 200, the enhanced primary roller assemblies 206*a*,206*b* are easier to manufacture and more economically feasible than conventional larger diameter rollers that would be required for the same length. The use of a plurality of roller elements 306 provides a high dimensional tolerance across the entire length 424 of the primary roller assembly 206.

Blind Trans-Torque Tightening Mechanism for Primary Roller Members.

Figure 14:
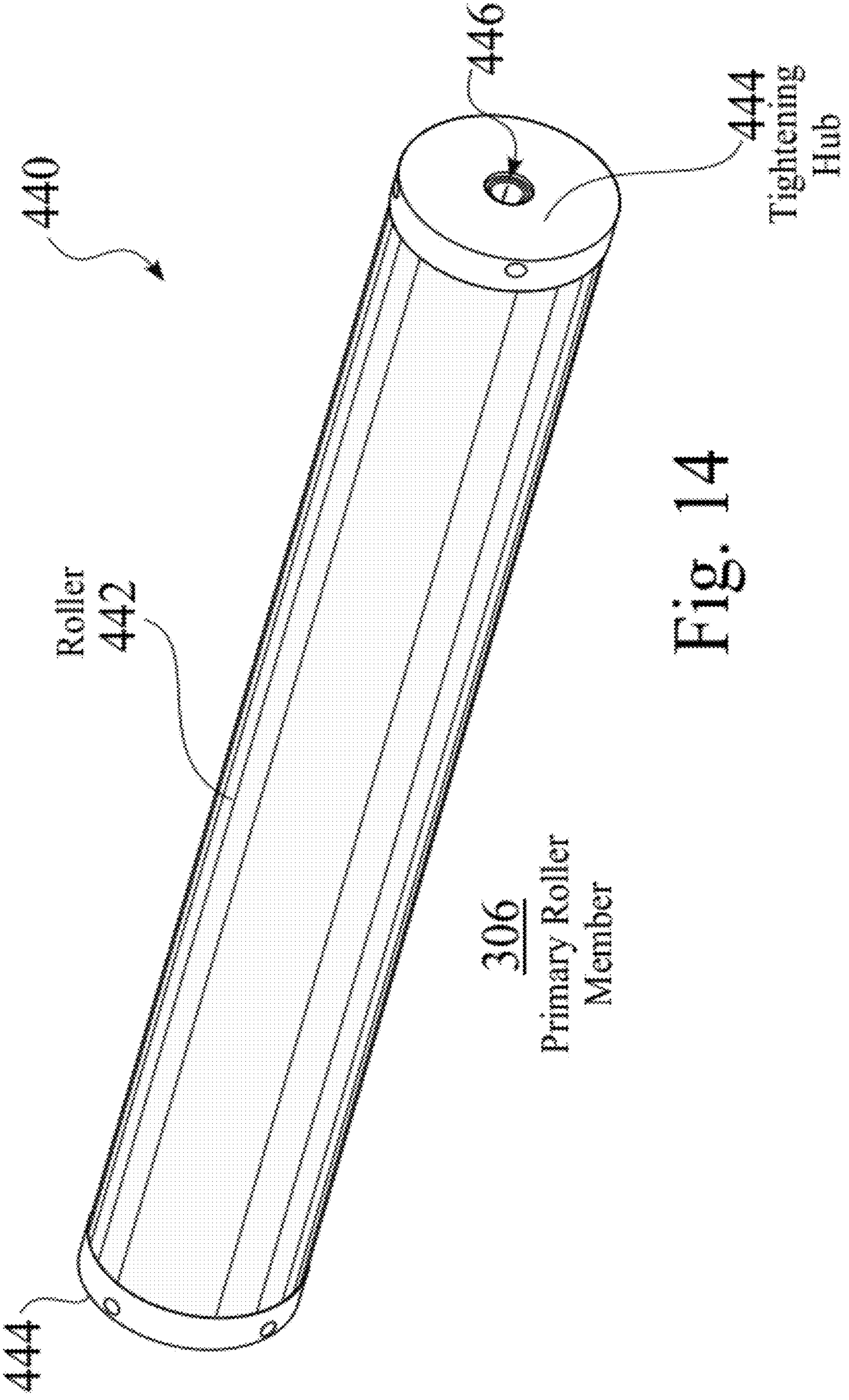
FIG. 14 shows an exemplary roller element and associated tightening hubs.
Figure 15:
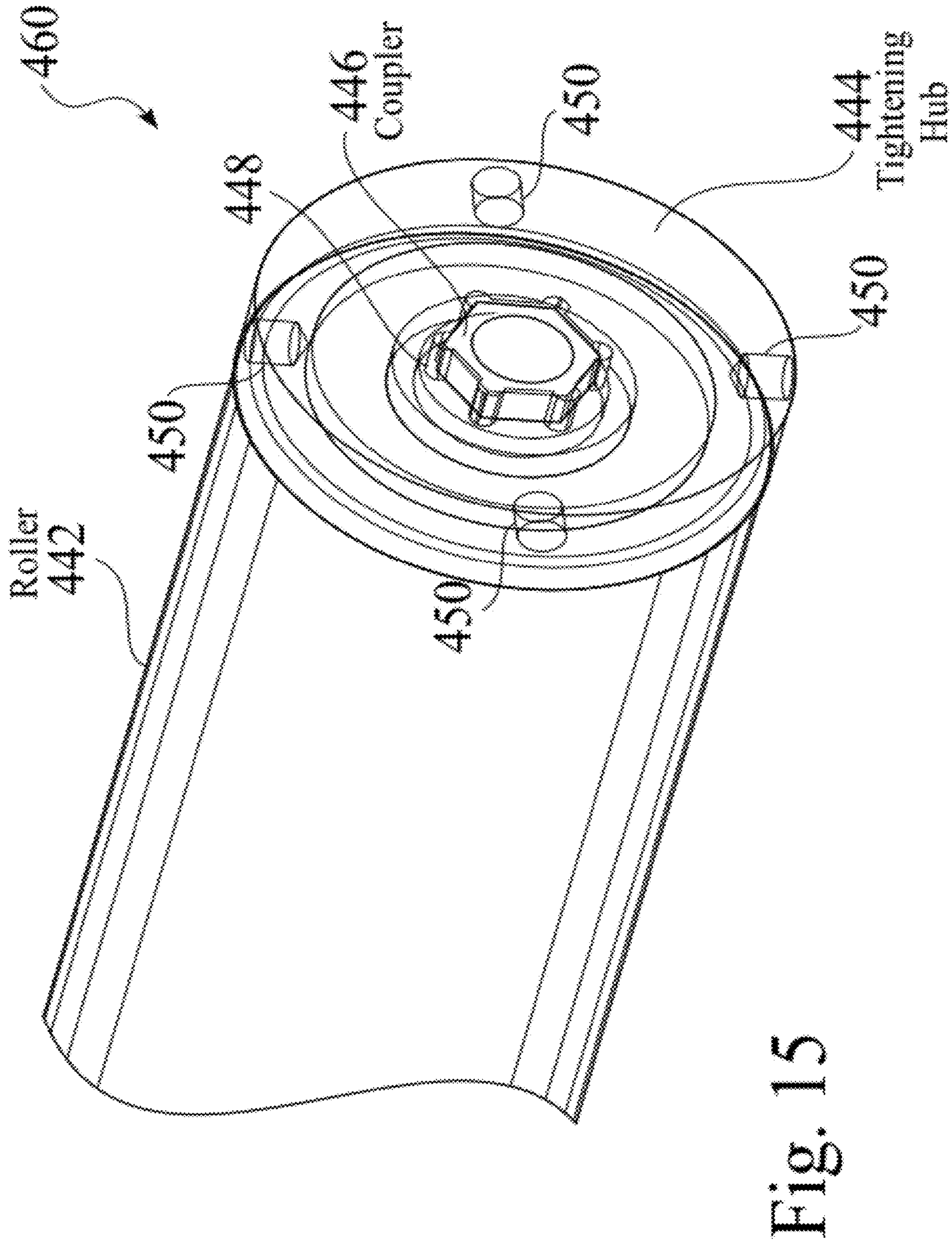
FIG. 15 shows a detailed partial end view of a roller having a coupler and tightening hub.
Figure 16:
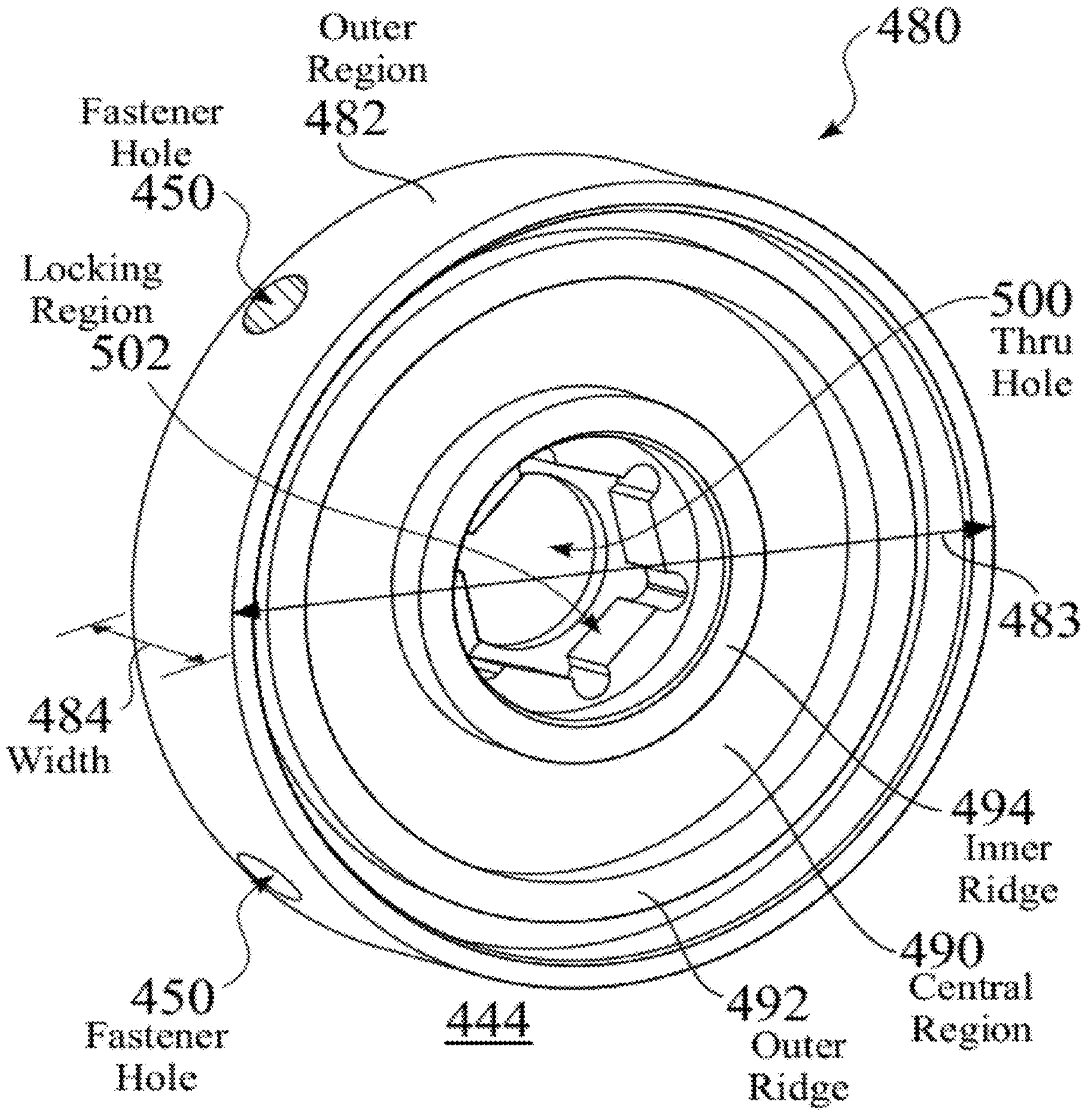
FIG. 16 is a detailed perspective view of a tightening hub.

FIG. 14 is a schematic view 440 an exemplary primary roller member 306, which comprises a cylindrical roller member 442 and tightening hubs 444 that are mountable at opposing ends of the roller member 442. FIG. 15 shows a detailed partial end view 460 of a roller member 306 having a coupler 446 and a tightening hub 444. FIG. 16 is a detailed perspective view 480 of a tightening hub 444.

As the primary roller assemblies 206 may preferably comprise a plurality of roller members 306 that are mounted between the support ribs 244 of the media transport frame 202, each of the roller members 306 further comprise a mechanism 450 (FIG. 15) for affixing the roller member 306 to a corresponding primary roller shaft 410 (FIG. 12).

As the media transport belt 14 runs over the rib sections 244 and corresponding alignment plates 402 (FIG. 12), the primary roller members 306 may preferably be configured to minimize the gap, e.g. less than 0.125 inch, between the end of the roller members 306 and the ribs 244. The hubs 444 allow tightening of the couplers between a roller member 306 and a primary roller shaft 410 (FIG. 12) in places where access to the coupler nut 446 (FIG. 15) is restricted by framework or other support mechanism(s). The tightening hub 444 is preferably cut or otherwise formed to be the same outside diameter of the central roller 442. The center of the hub 444 has a locking region 502, e.g. a pocket 502, milled or otherwise formed to tightly accept the coupler 446 (FIG. 15). In some embodiments, a spanner wrench may be used to tighten the couplers 446, which may comprise nuts 446, such as through access holes 450.

The exemplary tightening hub 444 seen in FIG. 16 comprises an outer region 482 having a diameter 483 and a width 484. The tightening hub 444 comprises a hole 500 defined through the center, wherein the primary roller shaft 410 (FIG. 12) may extend therethrough. A central region 490 extends outward to the outer region 482, and may further comprise an inner ridge 494 and/or an outer ridge 492. A locking region 502 is formed around the thru hole 500, to mate to a coupler 446 affixed to the primary roller shaft 410.

Enhanced Vacuum Table Structures and Processes.

Figure 17:
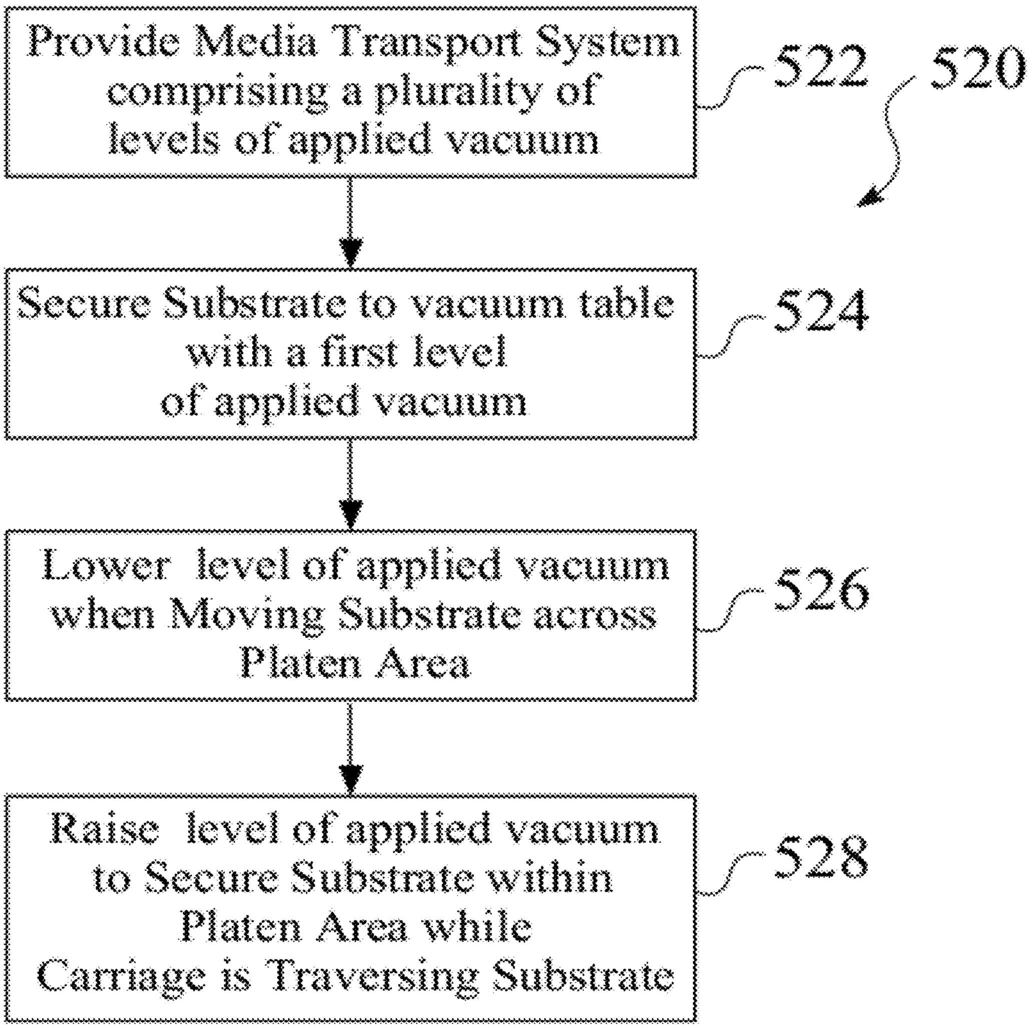
FIG. 17 is a flow chart of an exemplary process associated with an enhanced vacuum table.

FIG. 17 is a flow chart of an exemplary process 520 associated with an enhanced vacuum table 210 (FIG. 6). A media transport system, e.g. 200, is provided 522, wherein different levels of vacuum may be applied to the vacuum table 210, such as through vacuum blower assembles 250 (FIG. 7). The vacuum table 210 may preferably be switched between low and high states of vacuum pressure 284 (FIG. 7), to facilitate high pressure 284 hold down of media 54 while the carriage 16 is traversing, and low pressure 284 while stepping.

A substrate or media 54 may be secured 524 to the vacuum table 210, e.g. acting through a porous belt 14, when a first level of vacuum 284 is controllably applied to the vacuum table 210. A second, lower level of vacuum 284 may controllably applied 526, e.g. switched to a lower level, when moving the substrate 54 across the print platen area 22, such as when driving the belt 14 with the primary rollers 206. The applied vacuum 284 may raised again 528, such as by switching back to the first higher level, to secure the substrate 54 in relation to the platen area 22, e.g. while the carriage 16 is controllably moved across the substrate 54. The vacuum 284 applied to the media 54 can therefore be greatly reduced, while the belt 14 is stepping, and reapplied to full force, before the print heads 50 traverse the media 54.

Figure 18:
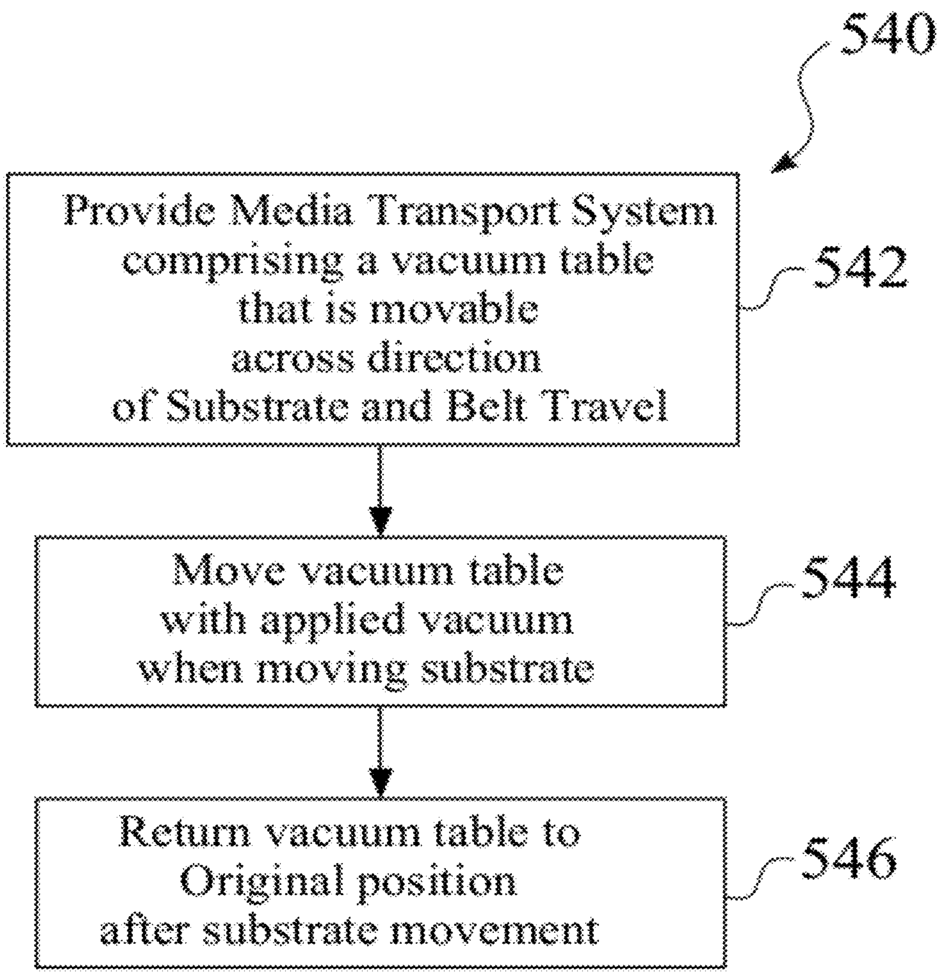
FIG. 18 is a flow chart of an exemplary process associated with an alternate enhanced vacuum table.

FIG. 18 is a flow chart of an exemplary process 540 associated with an alternate enhanced vacuum table 210 (FIG. 6). A media transport system, e.g. 200, is provided 542, wherein the vacuum table 210 is movable across the direction of substrate and belt travel 208 (FIG. 6). The vacuum table 210 is controllably moved 544 with applied vacuum 284 when moving the substrate 54, and returned 546 to its original position after moving the substrate 54.

A consistent high level of vacuum 284 may therefore travel with the belt 14 during a step of moving the media 54, and then return to the original position after the movement. The alternate vacuum table 210 is configured to move in relation to the system 200 as the media transport belt 14 steps forward. Then, after the step is complete, the alternate vacuum table 210 is pushed back to the starting position, e.g. such as by a plurality of air cylinders, after the move is complete. The movement of the vacuum table 210 to the start position is accomplished while the drive mechanism, 216, e.g. motor 216 (FIG. 6) provides holding torque upon the rollers 206 and media transport belt 14. The alternate structure 200 and process 540 provides an adequately high amount of vacuum hold down 284, while not impeding the force required to step the media 54 accurately.

Enhanced Dual Rail System.

Figure 19:
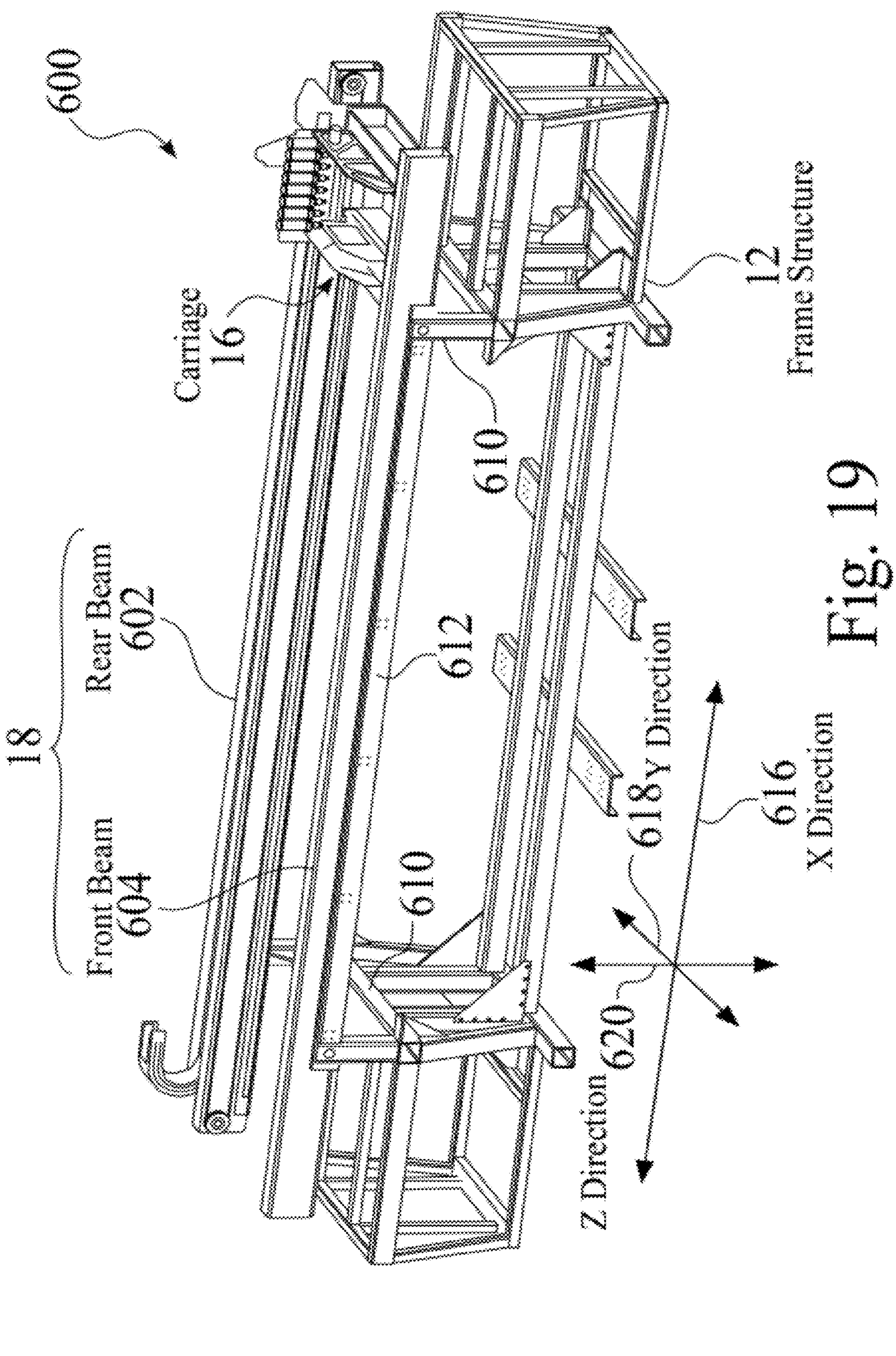
FIG. 19 is a partial schematic perspective view of a dual rail system.
Figure 20:
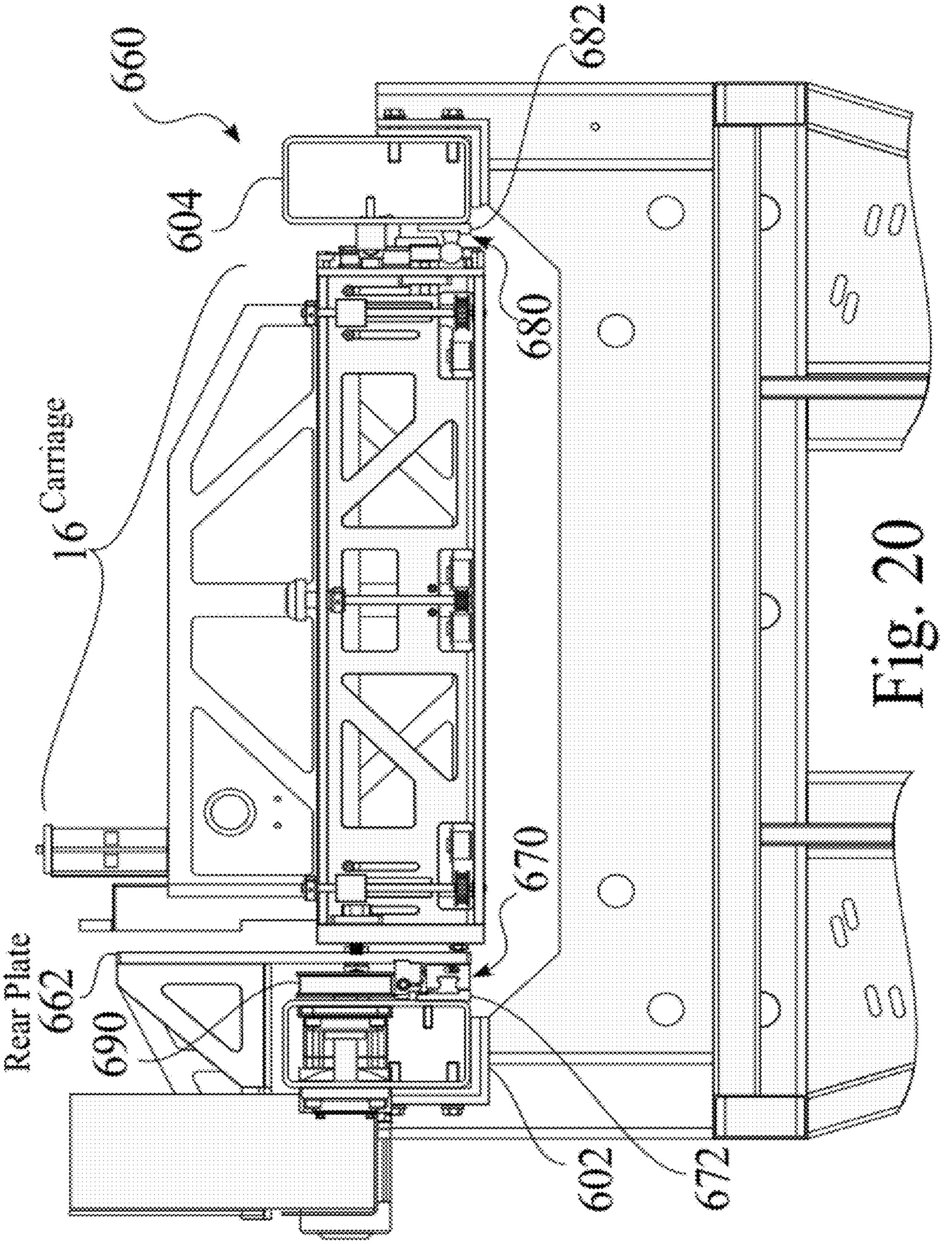
FIG. 20 is a partial cutaway view of an exemplary enhanced dual rail system.

FIG. 19 is a partial schematic perspective view 600 of an enhanced dual rail system 18. FIG. 20 is a partial cutaway view 660 of an exemplary enhanced dual rail system 18.

The exemplary enhanced dual rail system 18 seen in FIG. 19 comprises a rear beam or rail 602, and a front beam or rail 604, which are mounted to a frame structure 12, such as through cross supports 610 and opposing lateral supports 612. A carriage 16 is movably mounted between the rear beam 602 and the front beam 604, such that the carriage 16 may controllably traverse the length the enhanced dual rail system 18, e.g. along the X Direction 616.

As seen in FIG. 20, a constrained rail and bearing system 670 supports the rear of the carriage 16, such as through a rear carriage plate 662, wherein the constrained rail and bearing system 670 provides a straight and level path for controlled movement of the carriage 16.

As also seen in FIG. 20, the front of the carriage 16 is movably attached to the front rail 604, through a second rail and bearing system 680, which only constrains the carriage 16 in the Z direction 620, i.e. vertically.

In the enhanced rail system 18 seen in FIG. 19 and FIG. 20, the rails 602,604 are only required to be parallel to each other in the Z Direction 620. This can be accomplished by simply leveling the rails 602,604 in relation to each other. The enhanced rail system 18 therefore only requires that one rail, e.g. 602, remain to straight and level, while the other rail, e.g. 604, need only be level, which greatly reduces tolerancing and manufacturing issues.

Enhanced Carriage Structures.

Since the enhanced dual rail system 18 only requires that the front rail 604 be level with respect to the rear rail 604, the carriage 16 and bearing systems 670,680 comprise a mechanism to level the carriage 16 in relation to the print platen area 22, which is both reliable and non constraining.

Figure 21:
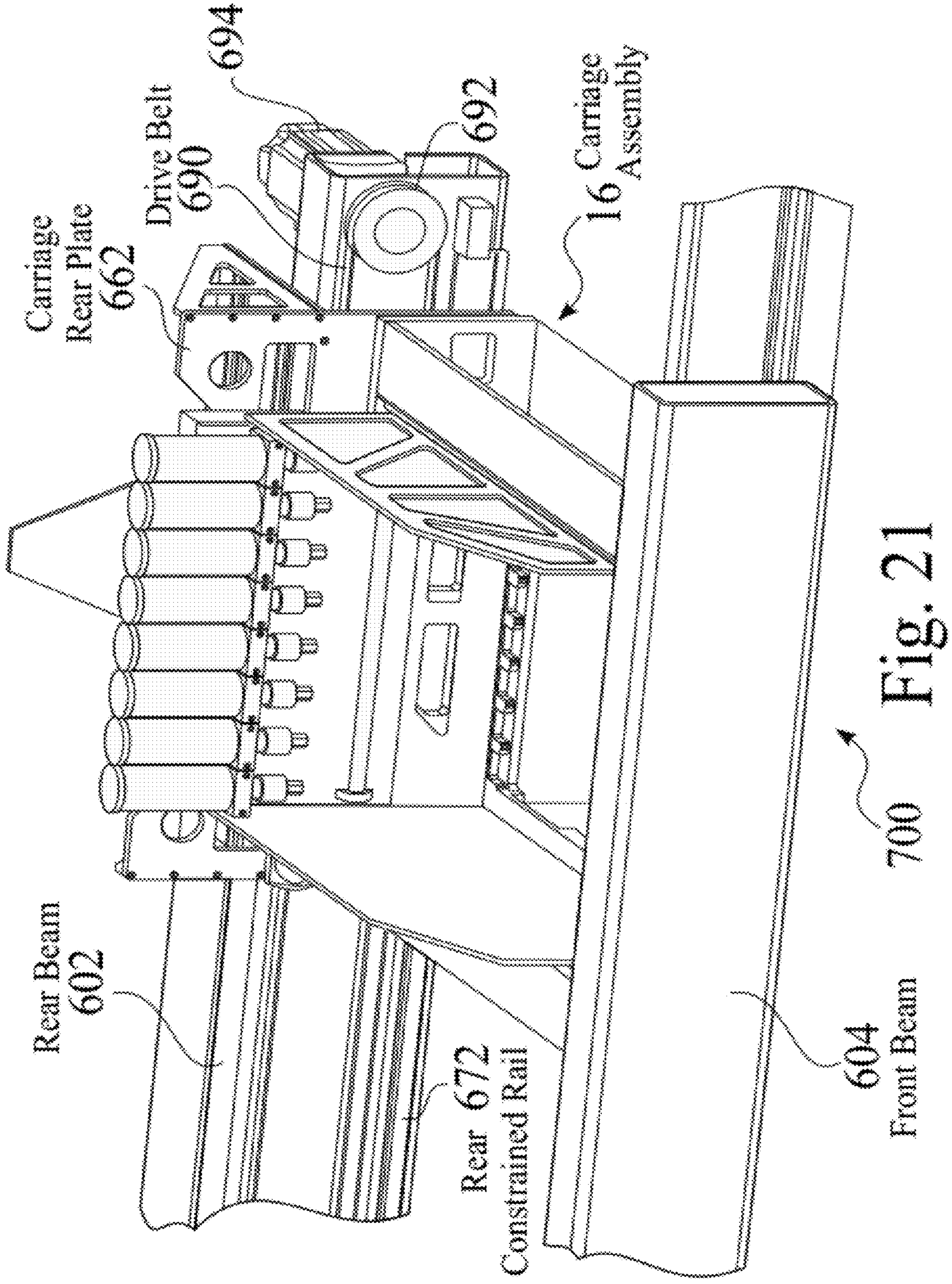
FIG. 21 is a partial schematic view of an enhanced carriage structure.
Figure 22:
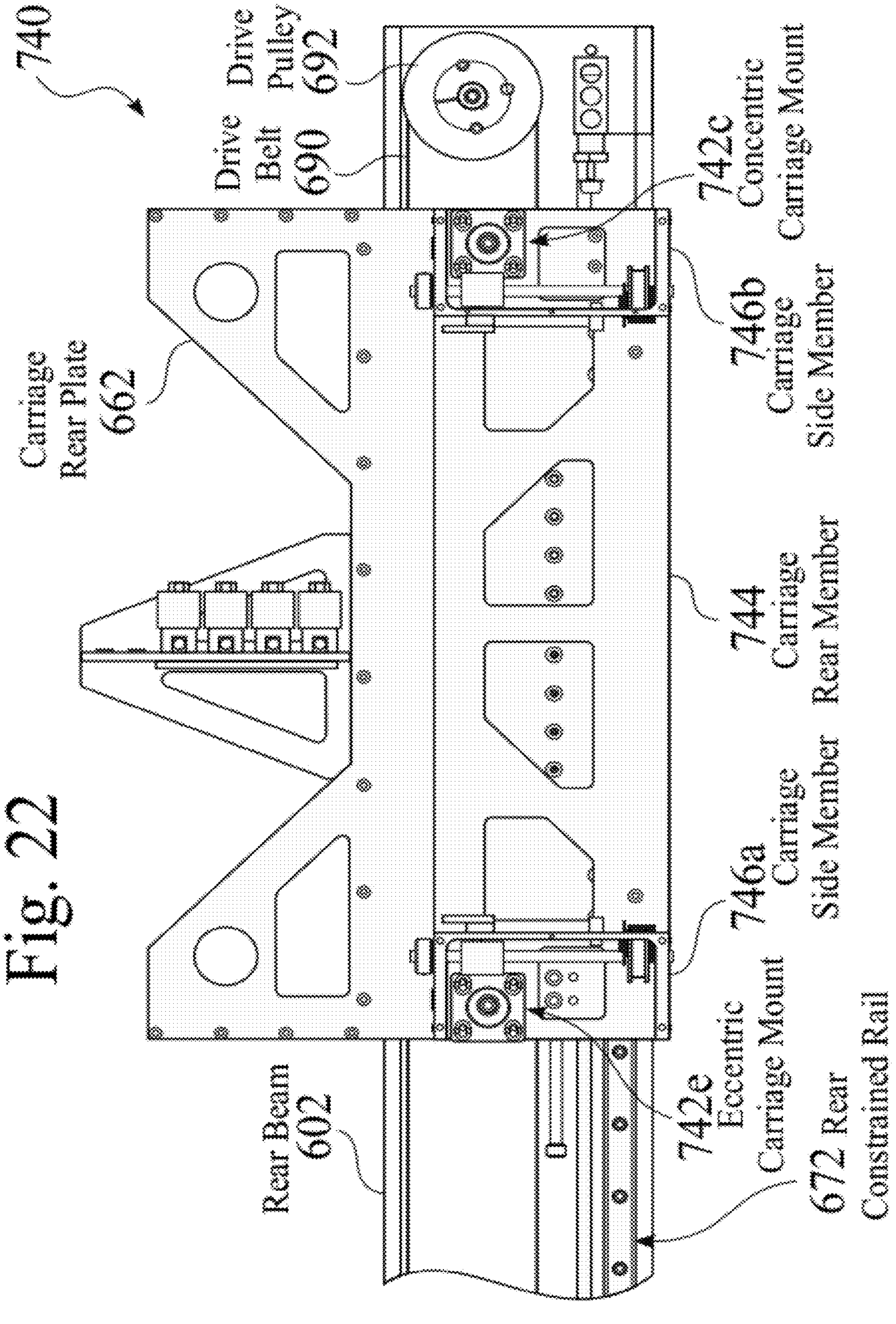
FIG. 22 is a partial schematic view of an exemplary carriage structure that provides level adjustments.
Figure 23:
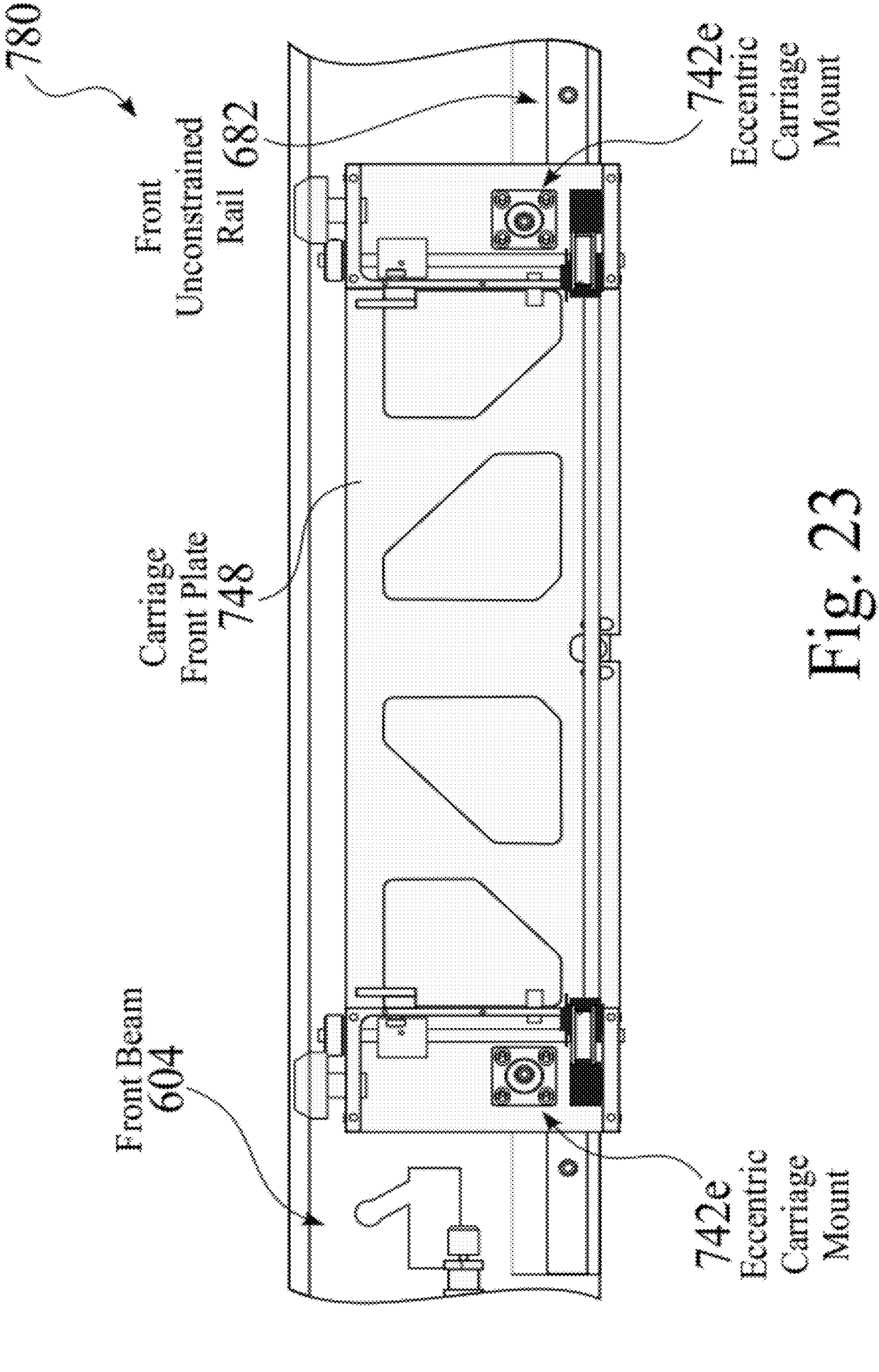
FIG. 23 is a partial schematic view of an exemplary carriage and a front plate.
Figure 24:
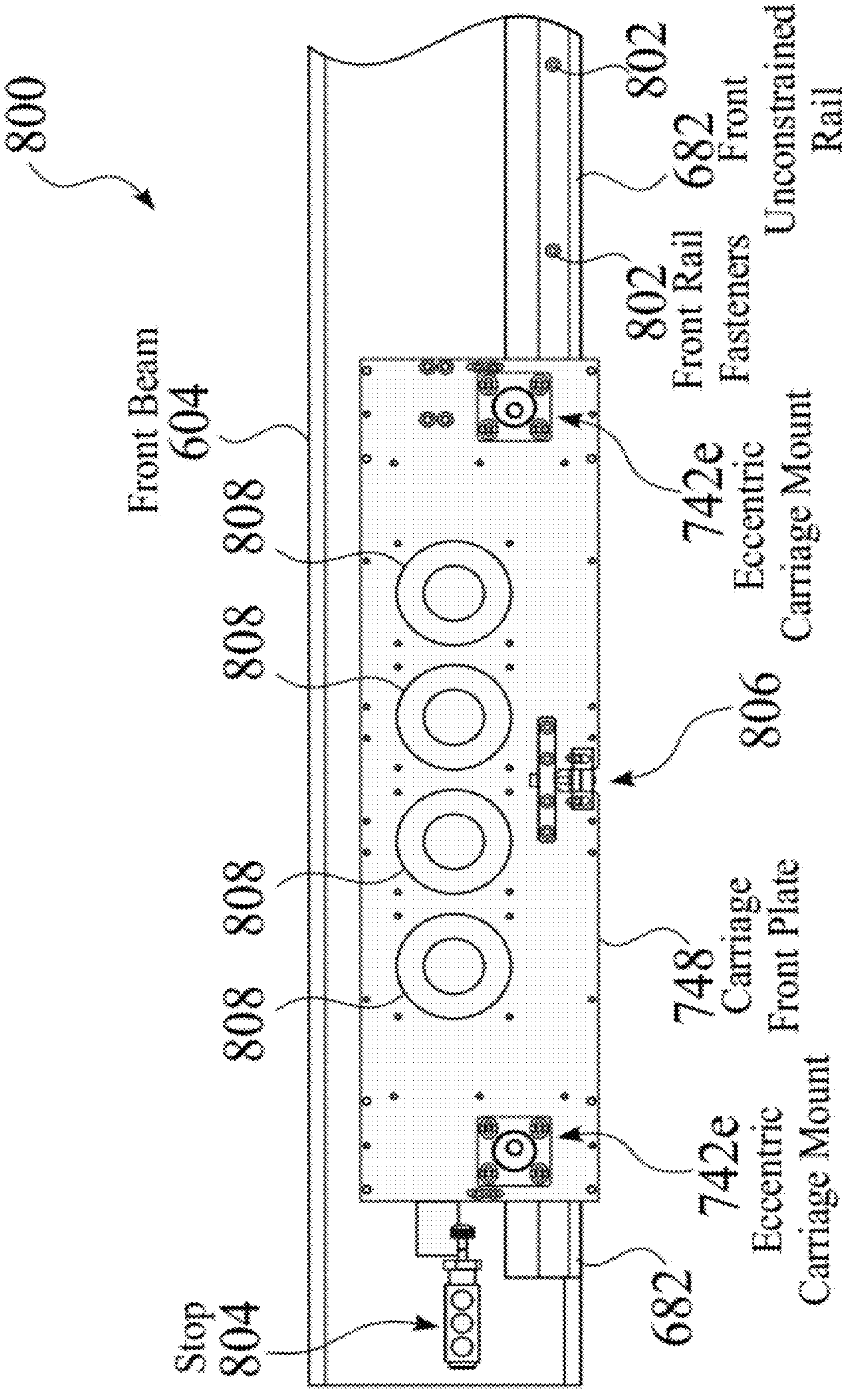
FIG. 24 is a partial schematic view of an alternate exemplary carriage and front plate.
Figure 25:
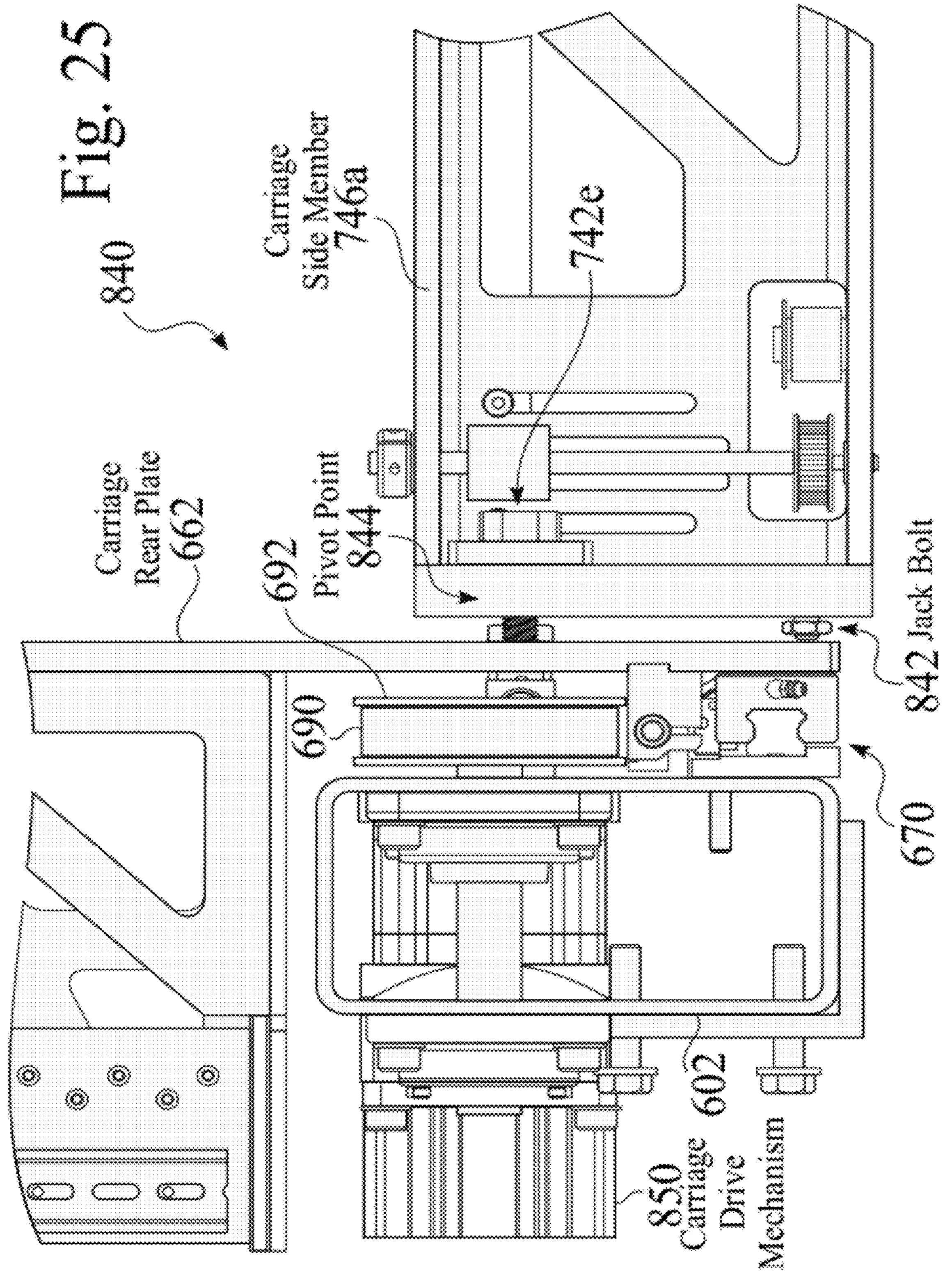
FIG. 25 is a partial schematic view of an exemplary back rail and plate system.

FIG. 21 is a simplified partial schematic view 700 of an enhanced carriage structure 16. FIG. 22 is a partial schematic view 740 of an exemplary carriage structure 16 that provides level adjustments. FIG. 23 is a partial schematic view 780 of an exemplary carriage 16 and a front plate 748. FIG. 24 is a partial schematic view 800 of an alternate exemplary carriage 16 and front plate 748. FIG. 25 is a partial schematic view 840 of an exemplary back rail 602 and plate system 670.

The carriage 16 is mounted on all four corners to the rail system 108. In some system embodiments 10, the mounts preferably provide eccentric adjustment 742*e* on three of the corners, and concentric adjustment 742*c* on the fourth corner, such as to provide easy adjustment and alignment.

The carriage seen in FIG. 22 is movable in relation to the rear beam 602, through controlled movement of the drive belt 690 and drive pulley 692. A rear constrained rail 672 is fixably mounted to the rear beam 602, and provides constrained movement of the carriage 16 through the constrained rail and bearing system 670.

As also seen in FIG. 22, the carriage 16 may be adjustably leveled in relation to the rear rail 602. The concentric carriage mount 742*c* provides a pivot point, while the eccentric carriage mount 742*e* provides the mechanism to level the rear of the carriage 16.

As seen in FIG. 23 and FIG. 24, front adjustment mechanisms 742*e* may be used to level the front of the carriage 16, and the front to the rear of the carriage 16. As seen in FIG. 25, the rear pivot mounts 742 alleviate the need to high flatness tolerance of the back rail and plate system, while jack bolts 842 support the weight of the assembly.

System and Method for Identification of Consumables Using a Central Database.

Figure 26:
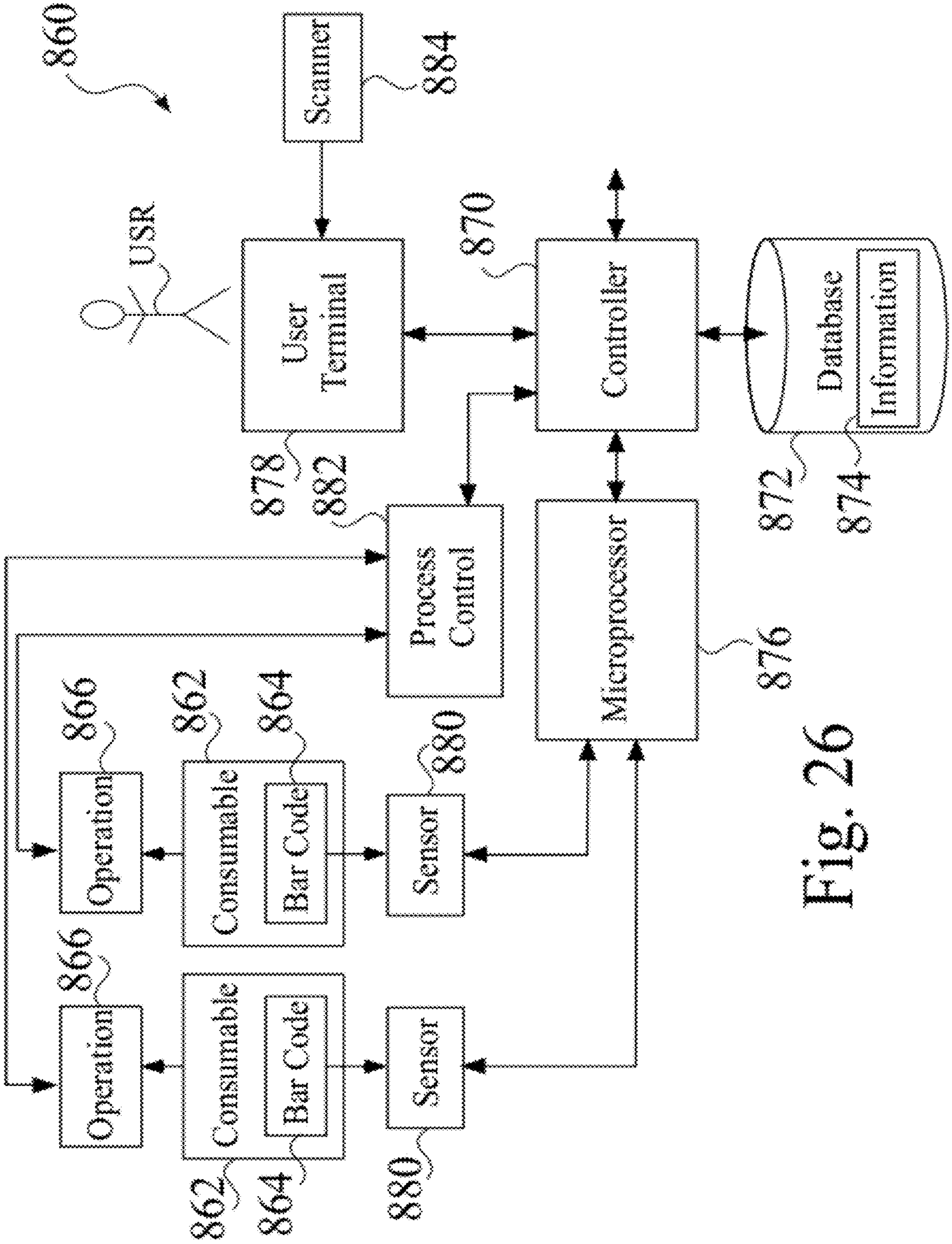
FIG. 26 is a schematic view of an enhanced printing system that provides identification of consumables.
Figure 27:
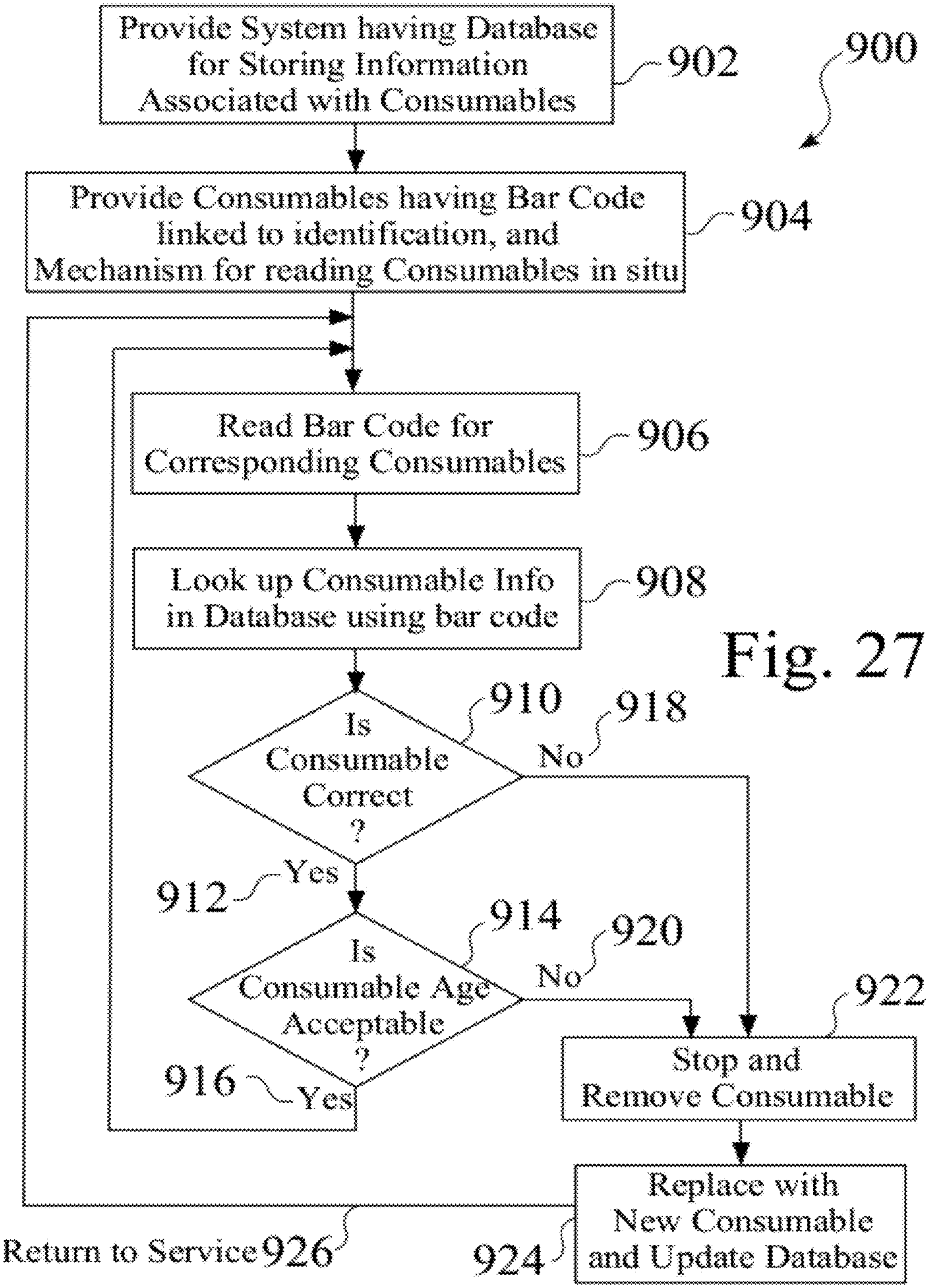
FIG. 27 is a flow chart for an exemplary process for identification of consumables using a central database.

FIG. 26 is a schematic view of an enhanced system 860 that provides identification of consumables 862, such as for but not limited to a printing system. FIG. 27 is a flow chart for an exemplary process 900 for identification of consumables 862 using a central database 872. One or more consumables 862 have an identifier, e.g. a bar code 864 associated therewith, wherein the consumables 862 may be linked to one or more operations 866. A controller 870 may communicate with a database 872, which stores information related to the consumables 862, such as corresponding to the bar code identifiers 864. A mechanism 880 may be provided, such as to identify the consumables 864 by reading or otherwise sensing the bar codes 864. The sensors 880 are in communication with the controller 870, such as directly or through a microprocessor 876. A user terminal 878 may also be linked to the controller 870, such as for a user USR. Preliminary capture of bar code information 864 may be performed by a scanner 884.

As seen in FIG. 27, a system, e.g. 860, is provided 902, wherein the system 860 has a central database 872 for storing information 874 that is associated with consumables 862. Consumables 862 are provided 904, which have a bar code 864 linked to their identification, which may preferably be read or sensed in situ. When a bar code 864 is read 906, the controller 870 looks up 906 information in the central database 872, using the bar code identifier 864. The controller 870 may determine 910 if the consumable 862 is correct 912, or not 918, and may also determine 914 if the age of the consumable 862 is acceptable 916 or not 920.

If the consumable is correct 912 and has an acceptable age 916, the process may halt, or may return to monitor one or more consumables 862. If the consumable is either not correct 918 or has an unacceptable age 920, the process 860 may stop 922 one or more operations 866, e.g. such that the consumable may be removed 922 and replaced 924, before returning 926 to service.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A water based binary epoxy ink for use in an inkjet printer, comprising:

a first part comprising an epoxy resin and water; and a second part comprising a curative and water;

wherein the first part and the second part are configured to be jetted separately and impingedly mixed on a media.

2. The water based binary epoxy ink of claim 1, wherein the first part further comprises a pigment.

3. The water based binary epoxy ink of claim 2, wherein the pigment in the first part comprises 0 to 10 percent by weight.

4. The water based binary epoxy ink of claim 1, wherein the epoxy resin comprises BisPhenol-A epoxy resin.

5. The water based binary epoxy ink of claim 1, wherein the epoxy resin comprises 0.1 to 20 percent by weight of the first part.

6. The water based binary epoxy ink of claim 1, wherein the first part further comprises at least one dispersant.

7. The water based binary epoxy ink of claim 6, wherein the dispersant in the first part comprises up to 20 percent by weight.

8. The water based binary epoxy ink of claim 1, wherein the first part further comprises an anti-skinning agent.

9. The water based binary epoxy ink of claim 8, wherein the anti-skinning agent in the first part comprises up to 10 percent by weight of the first part.

10. The water based binary epoxy ink of claim 1, wherein the first part further comprises at least one co-solvent.

11. The water based binary epoxy ink of claim 10, wherein the at least one co-solvent in the first part comprises any of a freezing point reducer, a dry speed modifier, a film former, or any combination thereof.

12. The water based binary epoxy ink of claim 10, wherein the at least one co-solvent in the first part comprises up to 50 percent by weight of the first part.

13. The water based binary epoxy ink of claim 1, wherein the first part further comprises at least one surfactant.

14. The water based binary epoxy ink of claim 13, wherein the at least one surfactant in the first part comprises any of a wetting agent, a film former, a defoamer, a polysiloxanes, butanedioic acid, or any combination thereof.

15. The water based binary epoxy ink of claim 1, wherein the water in the first part comprises 1 to 99 percent by weight of the first part.

16. The water based binary epoxy ink of claim 1, wherein the second part further comprises a pigment.

17. The water based binary epoxy ink of claim 16, wherein the pigment in the second part comprises up to 10 percent by weight.

18. The water based binary epoxy ink of claim 1, wherein the curative comprises a modified polyamine resin.

19. The water based binary epoxy ink of claim 1, wherein the curative comprises 0.1 to 50 percent by weight of the second part.

20. The water based binary epoxy ink of claim 1, wherein the second part further comprises one or more dispersants.

21. The water based binary epoxy ink of claim 20, wherein the dispersants in the second part comprise high molecular weight block copolymers with pigment affinic groups.

22. The water based binary epoxy ink of claim 20, wherein the dispersants in the second part comprise up to 10 percent by weight.

23. The water based binary epoxy ink of claim 1, wherein the second part further comprises an anti-skinning agent.

24. The water based binary epoxy ink of claim 23, wherein the anti-skinning agent in the second part comprises a high flash point alcoholic solvent.

25. The water based binary epoxy ink of claim 23, wherein the anti-skinning agent in the second part comprises up to 10 percent by weight of the second part.

26. The water based binary epoxy ink of claim 1, wherein the second part further comprises at least one co-solvent.

27. The water based binary epoxy ink of claim 26, wherein the at least one co-solvent in the second part comprises any of a freezing point reducer, a dry speed modifier, a film former, or any combination thereof.

28. The water based binary epoxy ink of claim 26, wherein the at least one co-solvent in the second part comprises up to 50 percent by weight of the second part.

29. The water based binary epoxy ink of claim 1, wherein the second part further comprises at least one surfactant or defoamer.

30. The water based binary epoxy ink of claim 29, wherein the at least one surfactant or defoamer in the second part comprises any of polysiloxanes, butanedioic acid, or any combination thereof.

31. The water based binary epoxy ink of claim 29, wherein the at least one surfactant or defoamer in the second part comprises up to 10 percent by weight of the second part.

32. The water based binary epoxy ink of claim 1, wherein the water in the second part comprises 1 to 99 percent by weight of the second part.

* * * * *